US012406680B2

(12) United States Patent
Grill et al.

(10) Patent No.: US 12,406,680 B2
(45) **Date of Patent: *Sep. 2, 2025**

(54) LOW BITRATE AUDIO ENCODING/DECODING SCHEME HAVING CASCADED SWITCHES

(71) Applicant: Fraunhofer-Gesellschaft zur Foerderung der angewandten Forschung e.V., Munich (DE)

(72) Inventors: Bernhard Grill, Lauf (DE); Roch Lefebvre, Canton de Magog (CA); Bruno Bessette, Sherbrooke (CA); Jimmy Lapierre, Sherbrooke (CA); Philippe Gournay, Sherbrooke (CA); Redwan Salami, Saint-Laurent (CA); Stefan Bayer, Nuremberg (DE); Guillaume Fuchs, Nuremberg (DE); Stefan Geyersberger, Wuerzburg (DE); Ralf Geiger, Nuremberg (DE); Johannes Hilpert, Nuremberg (DE); Ulrich Kraemer, Stuttgart (DE); Jérémie Lecomte, Nuremberg (DE); Markus Multrus, Nuremberg (DE); Max Neuendorf, Nuremberg (DE); Harald Popp, Tuchenbach (DE); Nikolaus Rettelbach, Nuremberg (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 0 days.

This patent is subject to a terminal disclaimer.

(21) Appl. No.: 18/940,575

(22) Filed: Nov. 7, 2024

(65) Prior Publication Data

US 2025/0061903 A1 Feb. 20, 2025

Related U.S. Application Data

(63) Continuation of application No. 18/451,067, filed on Aug. 16, 2023, which is a continuation of application (Continued)

(30) Foreign Application Priority Data

Oct. 8, 2008 (EP) .................................... 08017663
Feb. 18, 2009 (EP) .................................... 09002271

(51) Int. Cl.
*G10L 19/18* (2013.01)
*G10L 19/008* (2013.01)
(Continued)

(52) U.S. Cl.
CPC .......... *G10L 19/008* (2013.01); *G10L 19/173* (2013.01); *G10L 19/18* (2013.01);
(Continued)

(58) Field of Classification Search
CPC ..... G10L 19/008; G10L 19/02; G10L 19/022; G10L 19/06; G10L 19/173; G10L 19/18; G10L 19/26; G10L 19/20
(Continued)

(56) References Cited

U.S. PATENT DOCUMENTS 5,890,110 A 3/1999 Gersho et al.
6,134,518 A 10/2000 Cohen et al.
(Continued)

FOREIGN PATENT DOCUMENTS

CN 1677492 A 10/2005
EP 0932141 A2 7/1999
(Continued)

OTHER PUBLICATIONS

3GPP TS 26.290 version 2.0.0 Extended Adaptive Multi-Rate—Wideband codec; Transcoding functions, Release 6; TSG-SA WG4, TSG SA Meeting #25, Palm Springs, USA, Sep. 2004, 86 pages.
(Continued)

*Primary Examiner* — Martin Lerner
(74) *Attorney, Agent, or Firm* — PERKINS COIE LLP; Michael A. Glenn

(57) ABSTRACT

An audio encoder has a first information sink oriented encoding branch such as a spectral domain encoding branch, a second information source or SNR oriented encoding branch such as an LPC-domain encoding branch, and a switch for switching between the first and second encoding branches, the second encoding branch having a converter into a specific domain different from the spectral domain such as an LPC analysis stage generating an excitation signal, and the second encoding branch having a specific domain coding branch such as LPC domain processing branch, and a specific spectral domain coding branch such as (Continued)

LPC spectral domain processing branch, and an additional switch for switching between the specific domain coding branch and the specific spectral domain coding branch. An audio decoder has a first domain decoder, a second domain decoder, and a third domain decoder as well as two cascaded switches for switching between the decoders.

15 Claims, 21 Drawing Sheets

Related U.S. Application Data

No. 17/933,567, filed on Sep. 20, 2022, now Pat. No. 11,823,690, which is a continuation of application No. 16/834,601, filed on Mar. 30, 2020, now Pat. No. 11,475,902, which is a continuation of application No. 16/398,082, filed on Apr. 29, 2019, now Pat. No. 10,621,996, which is a continuation of application No. 14/580,179, filed on Dec. 22, 2014, now Pat. No. 10,319,384, which is a continuation of application No. 13/004,385, filed on Jan. 11, 2011, now Pat. No. 8,930,198, which is a continuation of application No. PCT/EP2009/004652, filed on Jun. 26, 2009.

(60) Provisional application No. 61/079,854, filed on Jul. 11, 2008.

(51) Int. Cl.

| | |
|---|---|
| ***G10L 19/16*** | (2013.01) |
| ***G10L 19/20*** | (2013.01) |
| ***G10L 19/26*** | (2013.01) |
| *G10L 19/00* | (2013.01) |
| *G10L 19/02* | (2013.01) |

(52) U.S. Cl.
CPC .. *G10L 2019/0008* (2013.01); *G10L 19/0017* (2013.01); *G10L 19/0212* (2013.01)

(58) Field of Classification Search
USPC .......................... 704/205, 206, 219, 500, 501
See application file for complete search history.

(56) References Cited

U.S. PATENT DOCUMENTS

| | | | | |
|---|---|---|---|---|
| 6,785,645 | B2 | 8/2004 | Khalil et al. | |
| 6,978,241 | B1 | 12/2005 | Sluijter et al. | |
| 7,139,700 | B1 | 11/2006 | Stachurski et al. | |
| 7,222,070 | B1 | 5/2007 | Stachurski et al. | |
| 7,605,722 | B2 | 10/2009 | Beack et al. | |
| 7,663,513 | B2 | 2/2010 | Pang et al. | |
| 7,739,120 | B2 | 6/2010 | Maekinen | |
| 7,751,485 | B2 | 7/2010 | Pang et al. | |
| 7,860,709 | B2 | 12/2010 | Maekinen | |
| 8,069,034 | B2 | 11/2011 | Maekinen et al. | |
| 8,275,626 | B2 | 9/2012 | Neuendorf et al. | |
| 8,321,210 | B2 | 11/2012 | Grill et al. | |
| 8,447,620 | B2 | 5/2013 | Neuendorf et al. | |
| 8,484,038 | B2 | 7/2013 | Bessette et al. | |
| 8,577,483 | B2 | 11/2013 | Oh et al. | |
| 8,744,843 | B2 | 6/2014 | Geiger et al. | |
| 8,744,863 | B2 | 6/2014 | Neuendorf et al. | |
| 8,751,246 | B2 | 6/2014 | Lecomte et al. | |
| 8,804,970 | B2 | 8/2014 | Grill et al. | |
| 8,930,198 | B2 | 1/2015 | Grill et al. | |
| 8,959,017 | B2 | 2/2015 | Grill et al. | |
| 9,043,215 | B2 | 5/2015 | Neuendorf et al. | |
| 10,319,384 | B2 | 6/2019 | Grill et al. | |
| 10,621,996 | B2 | 4/2020 | Grill et al. | |
| 11,475,902 | B2 | 10/2022 | Grill et al. | |
| 11,823,690 | B2 * | 11/2023 | Grill | G10L 19/173 |
| 11,942,101 | B2 | 3/2024 | Multrus et al. | |
| 12,334,086 | B2 * | 6/2025 | Grill | G10L 19/18 |
| 2003/0004711 | A1 | 1/2003 | Koishida et al. | |
| 2005/0192797 | A1 | 9/2005 | Makinen | |
| 2005/0192798 | A1 | 9/2005 | Vainio et al. | |
| 2005/0256701 | A1 | 11/2005 | Makinen | |
| 2005/0261892 | A1 | 11/2005 | Makinen et al. | |
| 2005/0261900 | A1 | 11/2005 | Ojala et al. | |
| 2005/0267742 | A1 | 12/2005 | Makinen | |
| 2006/0206334 | A1 | 9/2006 | Kapoor et al. | |
| 2007/0106502 | A1 | 5/2007 | Kim et al. | |
| 2007/0147518 | A1 | 6/2007 | Bessette | |
| 2007/0174051 | A1 | 7/2007 | Oh et al. | |
| 2007/0282599 | A1 | 12/2007 | Choo et al. | |
| 2008/0004869 | A1 | 1/2008 | Herre et al. | |
| 2008/0033732 | A1 | 2/2008 | Seefeldt et al. | |
| 2008/0147414 | A1 | 6/2008 | Son et al. | |
| 2008/0162121 | A1 | 7/2008 | Son et al. | |
| 2008/0172223 | A1 | 7/2008 | Oh et al. | |
| 2008/0234846 | A1 | 9/2008 | Malvar | |
| 2009/0110201 | A1 | 4/2009 | Kim et al. | |
| 2009/0110203 | A1 | 4/2009 | Taleb | |
| 2009/0210234 | A1 | 8/2009 | Sung et al. | |
| 2025/0061902 | A1 * | 2/2025 | Grill | G10L 19/008 |
| 2025/0061903 | A1 * | 2/2025 | Grill | G10L 19/173 |
| 2025/0069608 | A1 * | 2/2025 | Grill | G10L 19/173 |

FOREIGN PATENT DOCUMENTS

| | | | | |
|---|---|---|---|---|
| EP | 2144230 A1 | 1/2010 | | |
| EP | 2144231 A1 | 1/2010 | | |
| EP | 2146344 A1 | 1/2010 | | |
| EP | 1719120 B1 | 6/2019 | | |
| FI | 118835 B | 3/2008 | | |
| RU | 2006139794 A | 6/2008 | | |
| WO | 2005112004 A1 | 11/2005 | | |
| WO | 2008045846 A1 | 4/2008 | | |
| WO | 2008071353 A2 | 6/2008 | | |
| WO | WO-2010003532 A1 | * | 1/2010 | G10L 19/02 |
| WO | WO-2010040522 A2 | * | 4/2010 | G10L 19/008 |

OTHER PUBLICATIONS

Ramprashad, Sean, "The Multimode Transform Predictive Coding Paradigm", IEEE Transactions on Speech and Audio Processing, vol. 11, No. 2, Mar. 2003, pp. 117-129.

Spanias, Andreas S, "Speech Coding: A Tutorial Review", and Falk, H. "Prolog to Speech Coding: A Tutorial Review—A tutorial introduction to the paper by Spanias"; Proceedings of the IEEE vol. 82; Tempe, AZ, Oct. 10, 1994, pp. 1541-1582, 1539-1540.

* cited by examiner (Encoder)

(Decoder)

(Encoder)

(Encoder)

(Decoder)

(Encoder)

• each block of the 1st domain audio signal is represented by either a 2nd domain, a 3rd domain or a 4th domain encoded signal, apart from a optional crossover region analysis-by-synthesis CELP $A_L(z)$: long term prediction
≙ pitch (fine) structure $A(z)$: short term prediction
≙ format structure / spectral envelope (encoder side)

(decoder side)

LOW BITRATE AUDIO ENCODING/DECODING SCHEME HAVING CASCADED SWITCHES

CROSS-REFERENCE TO RELATED APPLICATIONS

This application is a continuation of U.S. patent application Ser. No. 18/451,067, filed Aug. 16, 2023, which is a continuation of U.S. patent application Ser. No. 17/933,567, filed Sep. 20, 2022, now U.S. Pat. No. 11,823,690, which is a continuation of U.S. patent application Ser. No. 16/834,601, filed Mar. 30, 2020, now U.S. Pat. No. 11,475,902, issued Oct. 18, 2022, which is a continuation of U.S. patent application Ser. No. 16/398,082, filed Apr. 29, 2019, now U.S. Pat. No. 10,621,996, issued Apr. 14, 2020, which in turn is a continuation of U.S. application Ser. No. 14/580,179, filed Dec. 22, 2014, now U.S. Pat. No. 10,319,384, issued Jun. 11, 2019, which is a continuation of U.S. patent application Ser. No. 13/004,385, filed Jan. 11, 2011, now U.S. Pat. No. 8,930,198, issued Jan. 6, 2015, which is a continuation of copending International Application No. PCT/EP2009/004652, filed Jun. 26, 2009, which is incorporated herein by reference in its entirety, and additionally claims priority from European Applications Nos. EP 08017663.9, filed Oct. 8, 2008, EP 09002271.6, filed Feb. 18, 2009 and U.S. Provisional Patent Application 61/079,854, filed Jul. 11, 2008, which are all incorporated herein by reference in their entirety.

BACKGROUND OF THE INVENTION

The present invention is related to audio coding and, particularly, to low bit rate audio coding schemes.

In the art, frequency domain coding schemes such as MP3 or AAC are known. These frequency-domain encoders are based on a time-domain/frequency-domain conversion, a subsequent quantization stage, in which the quantization error is controlled using information from a psychoacoustic module, and an encoding stage, in which the quantized spectral coefficients and corresponding side information are entropy-encoded using code tables.

On the other hand there are encoders that are very well suited to speech processing such as the AMR-WB+ as described in 3GPP TS 26.290. Such speech coding schemes perform a Linear Predictive filtering of a time-domain signal. Such a LP filtering is derived from a Linear Prediction analysis of the input time-domain signal. The resulting LP filter coefficients are then quantized/coded and transmitted as side information. The process is known as Linear Prediction Coding (LPC). At the output of the filter, the prediction residual signal or prediction error signal which is also known as the excitation signal is encoded using the analysis-by-synthesis stages of the ACELP encoder or, alternatively, is encoded using a transform encoder, which uses a Fourier transform with an overlap. The decision between the ACELP coding and the Transform Coded excitation coding which is also called TCX coding is done using a closed loop or an open loop algorithm.

Frequency-domain audio coding schemes such as the high efficiency-AAC encoding scheme, which combines an AAC coding scheme and a spectral band replication technique can also be combined with a joint stereo or a multi-channel coding tool which is known under the term "MPEG surround".

On the other hand, speech encoders such as the AMR-WB+ also have a high frequency enhancement stage and a stereo functionality.

Frequency-domain coding schemes are advantageous in that they show a high quality at low bitrates for music signals. Problematic, however, is the quality of speech signals at low bitrates.

Speech coding schemes show a high quality for speech signals even at low bitrates, but show a poor quality for music signals at low bitrates.

SUMMARY

According to an embodiment, an audio encoder for encoding an audio input signal, the audio input signal being in a first domain, may have a first coding branch for encoding an audio signal using a first coding algorithm to acquire a first encoded signal; a second coding branch for encoding an audio signal using a second coding algorithm to acquire a second encoded signal, wherein the first coding algorithm is different from the second coding algorithm; and a first switch for switching between the first coding branch and the second coding branch so that, for a portion of the audio input signal, either the first encoded signal or the second encoded signal is in an encoder output signal, wherein the second coding branch may have a converter for converting the audio signal into a second domain different from the first domain, a first processing branch for processing an audio signal in the second domain to acquire a first processed signal; a second processing branch for converting a signal into a third domain different from the first domain and the second domain and for processing the signal in the third domain to acquire a second processed signal; and a second switch for switching between the first processing branch and the second processing branch so that, for a portion of the audio signal input into the second coding branch, either the first processed signal or the second processed signal is in the second encoded signal.

According to another embodiment, a method of encoding an audio input signal, the audio input signal being in a first domain, may have the steps of encoding an audio signal using a first coding algorithm to acquire a first encoded signal; encoding an audio signal using a second coding algorithm to acquire a second encoded signal, wherein the first coding algorithm is different from the second coding algorithm; and switching between encoding using the first coding algorithm and encoding using the second coding algorithm so that, for a portion of the audio input signal, either the first encoded signal or the second encoded signal is in an encoded output signal, wherein encoding using the second coding algorithm may have the steps of converting the audio signal into a second domain different from the first domain, processing an audio signal in the second domain to acquire a first processed signal; converting a signal into a third domain different from the first domain and the second domain and processing the signal in the third domain to acquire a second processed signal; and switching between processing the audio signal and converting and processing so that, for a portion of the audio signal encoded using the second coding algorithm, either the first processed signal or the second processed signal is in the second encoded signal.

According to another embodiment a decoder for decoding an encoded audio signal, the encoded audio signal having a first coded signal, a first processed signal in a second domain, and a second processed signal in a third domain, wherein the first coded signal, the first processed signal, and the second processed signal are related to different time portions of a decoded audio signal, and wherein a first domain, the second domain and the third domain are different from each other, may have a first decoding branch for decoding the first encoded signal based on the first coding algorithm; a second decoding branch for decoding the first processed signal or the second processed signal, wherein the second decoding branch may have a first inverse processing branch for inverse processing the first processed signal to acquire a first inverse processed signal in the second domain; a second inverse processing branch for inverse processing the second processed signal to acquire a second inverse processed signal in the second domain; a first combiner for combining the first inverse processed signal and the second inverse processed signal to acquire a combined signal in the second domain; and a converter for converting the combined signal to the first domain; and a second combiner for combining the converted signal in the first domain and the first decoded signal output by the first decoding branch to acquire a decoded output signal in the first domain.

According to another embodiment, a method of decoding an encoded audio signal, the encoded audio signal having a first coded signal, a first processed signal in a second domain, and a second processed signal in a third domain, wherein the first coded signal, the first processed signal, and the second processed signal are related to different time portions of a decoded audio signal, and wherein a first domain, the second domain and the third domain are different from each other, may have the steps of decoding the first encoded signal based on a first coding algorithm; decoding the first processed signal or the second processed signal, wherein the decoding the first processed signal or the second processed signal may have the steps of inverse processing the first processed signal to acquire a first inverse processed signal in the second domain; inverse processing the second processed signal to acquire a second inverse processed signal in the second domain; combining the first inverse processed signal and the second inverse processed signal to acquire a combined signal in the second domain; and converting the combined signal to the first domain; and combining the converted signal in the first domain and the decoded first signal to acquire a decoded output signal in the first domain.

According to another embodiment an encoded audio signal may have a first coded signal encoded or to be decoded using a first coding algorithm, a first processed signal in a second domain, and a second processed signal in a third domain, wherein the first processed signal and the second processed signal are encoded using a second coding algorithm, wherein the first coded signal, the first processed signal, and the second processed signal are related to different time portions of a decoded audio signal, wherein a first domain, the second domain and the third domain are different from each other, and side information indicating whether a portion of the encoded signal is the first coded signal, the first processed signal or the second processed signal.

According to another embodiment a computer program for performing, when running on the computer, may have the method of encoding an audio signal, the audio input signal being in a first domain, the method having the steps of encoding an audio signal using a first coding algorithm to acquire a first encoded signal; encoding an audio signal using a second coding algorithm to acquire a second encoded signal, wherein the first coding algorithm is different from the second coding algorithm; and switching between encoding using the first coding algorithm and encoding using the second coding algorithm so that, for a portion of the audio input signal, either the first encoded signal or the second encoded signal is in an encoded output signal, wherein encoding using the second coding algorithm may have the steps of converting the audio signal into a second domain different from the first domain, processing an audio signal in the second domain to acquire a first processed signal; converting a signal into a third domain different from the first domain and the second domain and processing the signal in the third domain to acquire a second processed signal; and switching between processing the audio signal and converting and processing so that, for a portion of the audio signal encoded using the second coding algorithm, either the first processed signal or the second processed signal is in the second encoded signal.

According to another embodiment a computer program for performing, when running on the computer, may have method of decoding an encoded audio signal, the encoded audio signal having a first coded signal, a first processed signal in a second domain, and a second processed signal in a third domain, wherein the first coded signal, the first processed signal, and the second processed signal are related to different time portions of a decoded audio signal, and wherein a first domain, the second domain and the third domain are different from each other, the method having the steps of decoding the first encoded signal based on a first coding algorithm; decoding the first processed signal or the second processed signal, wherein the decoding the first processed signal or the second processed signal may have the steps of inverse processing the first processed signal to acquire a first inverse processed signal in the second domain; inverse processing the second processed signal to acquire a second inverse processed signal in the second domain; combining the first inverse processed signal and the second inverse processed signal to acquire a combined signal in the second domain; and converting the combined signal to the first domain; and combining the converted signal in the first domain and the decoded first signal to acquire a decoded output signal in the first domain.

One aspect of the present invention is an audio encoder for encoding an audio input signal, the audio input signal being in a first domain, comprising: a first coding branch for encoding an audio signal using a first coding algorithm to obtain a first encoded signal; a second coding branch for encoding an audio signal using a second coding algorithm to obtain a second encoded signal, wherein the first coding algorithm is different from the second coding algorithm; and a first switch for switching between the first coding branch and the second coding branch so that, for a portion of the audio input signal, either the first encoded signal or the second encoded signal is in an encoder output signal, wherein the second coding branch comprises: a converter for converting the audio signal into a second domain different from the first domain, a first processing branch for processing an audio signal in the second domain to obtain a first processed signal; a second processing branch for converting a signal into a third domain different from the first domain and the second domain and for processing the signal in the third domain to obtain a second processed signal; and a second switch for switching between the first processing branch and the second processing branch so that, for a portion of the audio signal input into the second coding branch, either the first processed signal or the second processed signal is in the second encoded signal.

A further aspect is a decoder for decoding an encoded audio signal, the encoded audio signal comprising a first coded signal, a first processed signal in a second domain, and a second processed signal in a third domain, wherein the first coded signal, the first processed signal, and the second processed signal are related to different time portions of a decoded audio signal, and wherein a first domain, the second domain and the third domain are different from each other, comprising: a first decoding branch for decoding the first encoded signal based on the first coding algorithm; a second decoding branch for decoding the first processed signal or the second processed signal, wherein the second decoding branch comprises a first inverse processing branch for inverse processing the first processed signal to obtain a first inverse processed signal in the second domain; a second inverse processing branch for inverse processing the second processed signal to obtain a second inverse processed signal in the second domain; a first combiner for combining the first inverse processed signal and the second inverse processed signal to obtain a combined signal in the second domain; and a converter for converting the combined signal to the first domain; and a second combiner for combining the converted signal in the first domain and the decoded first signal output by the first decoding branch to obtain a decoded output signal in the first domain.

In an embodiment of the present invention, two switches are provided in a sequential order, where a first switch decides between coding in the spectral domain using a frequency-domain encoder and coding in the LPC-domain, i.e., processing the signal at the output of an LPC analysis stage. The second switch is provided for switching in the LPC-domain in order to encode the LPC-domain signal either in the LPC-domain such as using an ACELP coder or coding the LPC-domain signal in an LPC-spectral domain, which needs a converter for converting the LPC-domain signal into an LPC-spectral domain, which is different from a spectral domain, since the LPC-spectral domain shows the spectrum of an LPC filtered signal rather than the spectrum of the time-domain signal.

The first switch decides between two processing branches, where one branch is mainly motivated by a sink model and/or a psycho acoustic model, i.e. by auditory masking, and the other one is mainly motivated by a source model and by segmental SNR calculations. Exemplarily, one branch has a frequency domain encoder and the other branch has an LPC-based encoder such as a speech coder. The source model is usually the speech processing and therefore LPC is commonly used.

The second switch again decides between two processing branches, but in a domain different from the "outer" first branch domain. Again one "inner" branch is mainly motivated by a source model or by SNR calculations, and the other "inner" branch can be motivated by a sink model and/or a psycho acoustic model, i.e. by masking or at least includes frequency/spectral domain coding aspects. Exemplarily, one "inner" branch has a frequency domain encoder/spectral converter and the other branch has an encoder coding on the other domain such as the LPC domain, wherein this encoder is for example an CELP or ACELP quantizer/scaler processing an input signal without a spectral conversion.

A further embodiment is an audio encoder comprising a first information sink oriented encoding branch such as a spectral domain encoding branch, a second information source or SNR oriented encoding branch such as an LPC-domain encoding branch, and a switch for switching between the first encoding branch and the second encoding branch, wherein the second encoding branch comprises a converter into a specific domain different from the time domain such as an LPC analysis stage generating an excitation signal, and wherein the second encoding branch furthermore comprises a specific domain such as LPC domain processing branch and a specific spectral domain such as LPC spectral domain processing branch, and an additional switch for switching between the specific domain coding branch and the specific spectral domain coding branch.

A further embodiment of the invention is an audio decoder comprising a first domain such as a spectral domain decoding branch, a second domain such as an LPC domain decoding branch for decoding a signal such as an excitation signal in the second domain, and a third domain such as an LPC-spectral decoder branch for decoding a signal such as an excitation signal in a third domain such as an LPC spectral domain, wherein the third domain is obtained by performing a frequency conversion from the second domain wherein a first switch for the second domain signal and the third domain signal is provided, and wherein a second switch for switching between the first domain decoder and the decoder for the second domain or the third domain is provided.

BRIEF DESCRIPTION OF THE DRAWINGS

Embodiments of the present invention are subsequently described with respect to the attached drawings, in which.

DETAILED DESCRIPTION OF THE INVENTION

Figure 1A:
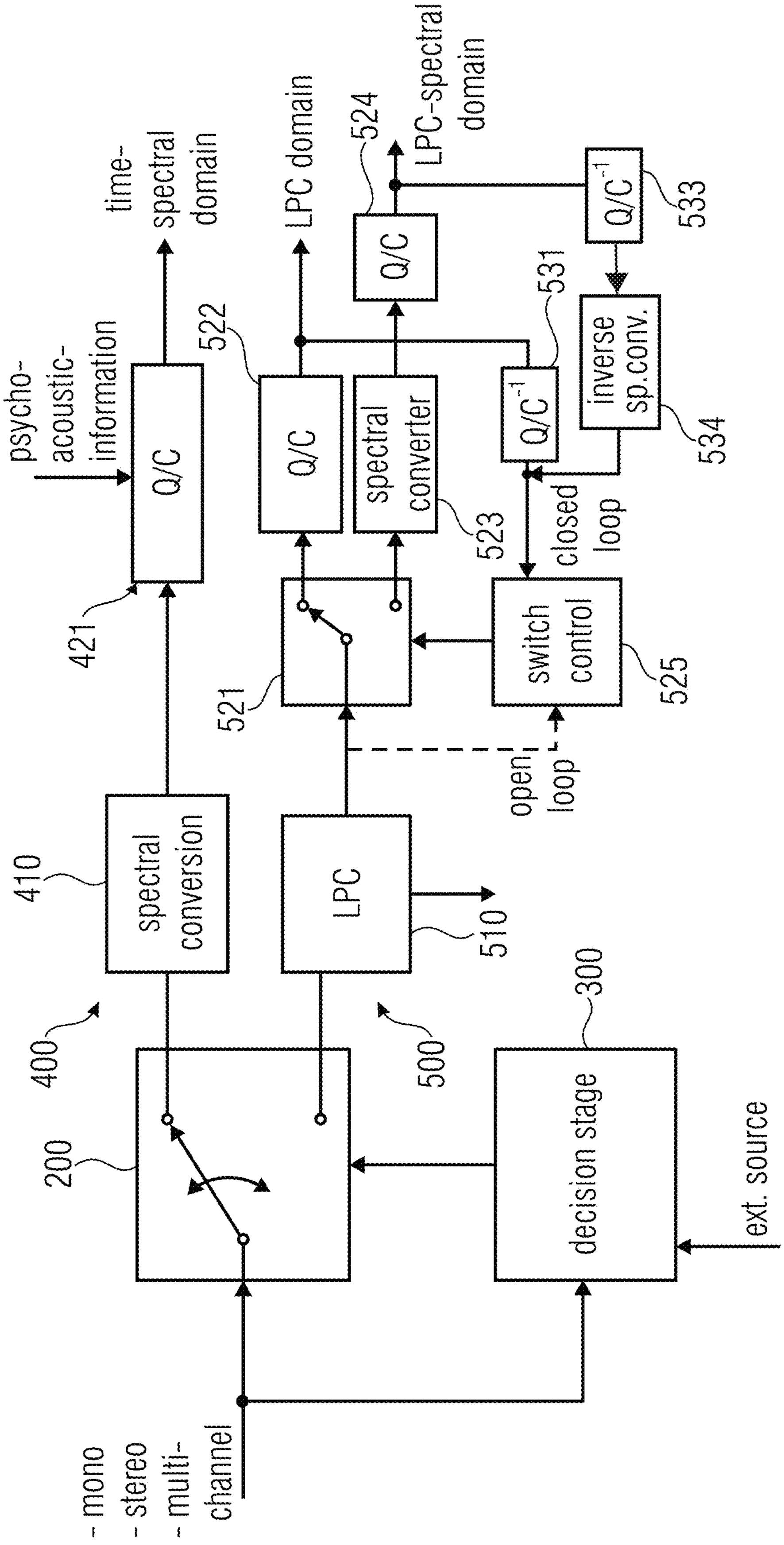
FIG. 1*a* is a block diagram of an encoding scheme in accordance with a first aspect of the present invention.

FIG. 1*a* illustrates an embodiment of the invention having two cascaded switches. A mono signal, a stereo signal or a multi-channel signal is input into a switch 200. The switch 200 is controlled by a decision stage 300. The decision stage receives, as an input, a signal input into block 200. Alternatively, the decision stage 300 may also receive a side information which is included in the mono signal, the stereo signal or the multi-channel signal or is at least associated to such a signal, where information is existing, which was, for example, generated when originally producing the mono signal, the stereo signal or the multi-channel signal.

The decision stage 300 actuates the switch 200 in order to feed a signal either in a frequency encoding portion 400 illustrated at an upper branch of FIG. 1*a* or an LPC-domain encoding portion 500 illustrated at a lower branch in FIG. 1*a*. A key element of the frequency domain encoding branch is a spectral conversion block 410 which is operative to convert a common preprocessing stage output signal (as discussed later on) into a spectral domain. The spectral conversion block may include an MDCT algorithm, a QMF, an FFT algorithm, a Wavelet analysis or a filterbank such as a critically sampled filterbank having a certain number of filterbank channels, where the subband signals in this filterbank may be real valued signals or complex valued signals. The output of the spectral conversion block 410 is encoded using a spectral audio encoder 421, which may include processing blocks as known from the AAC coding scheme.

Generally, the processing in branch 400 is a processing in a perception based model or information sink model. Thus, this branch models the human auditory system receiving sound. Contrary thereto, the processing in branch 500 is to generate a signal in the excitation, residual or LPC domain. Generally, the processing in branch 500 is a processing in a speech model or an information generation model. For speech signals, this model is a model of the human speech/sound generation system generating sound. If, however, a sound from a different source requiring a different sound generation model is to be encoded, then the processing in branch 500 may be different.

In the lower encoding branch 500, a key element is an LPC device 510, which outputs an LPC information which is used for controlling the characteristics of an LPC filter. This LPC information is transmitted to a decoder. The LPC stage 510 output signal is an LPC-domain signal which consists of an excitation signal and/or a weighted signal.

Figure 7A:
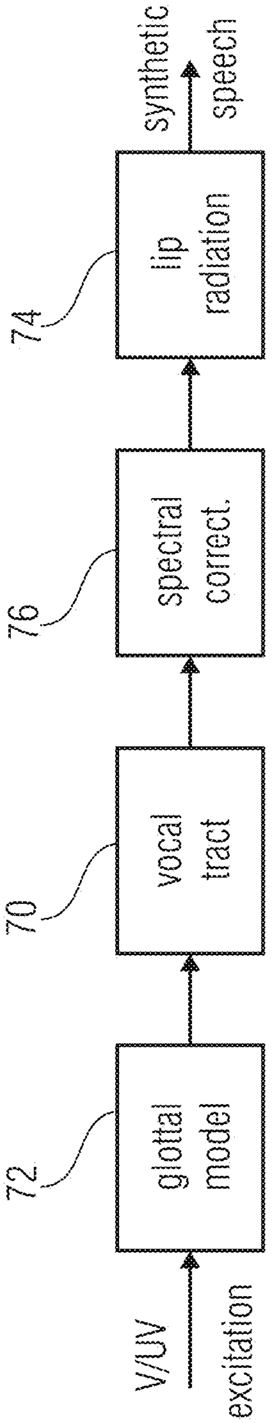
FIGS. 7*a* to 7*d* illustrate voiced/unvoiced excitation signals as an example for impulse-like signals.
Figure 7B:
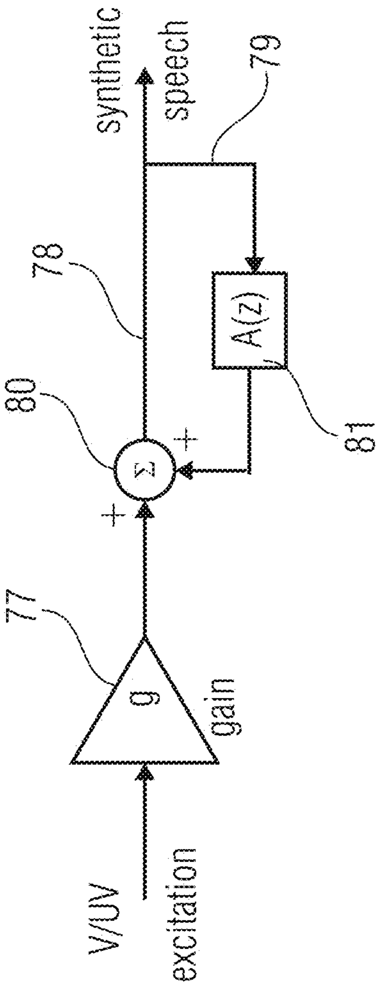
Figure 7C:
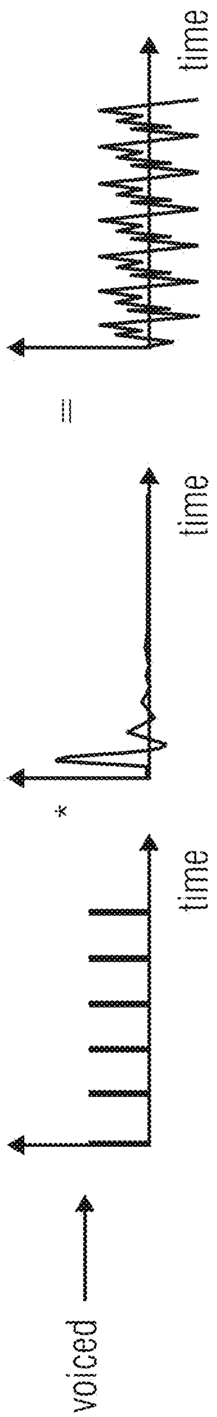
Figure 7D:
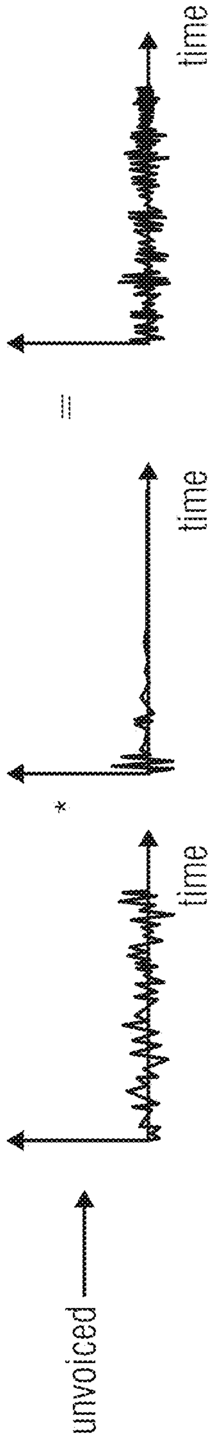
Figure 7E:
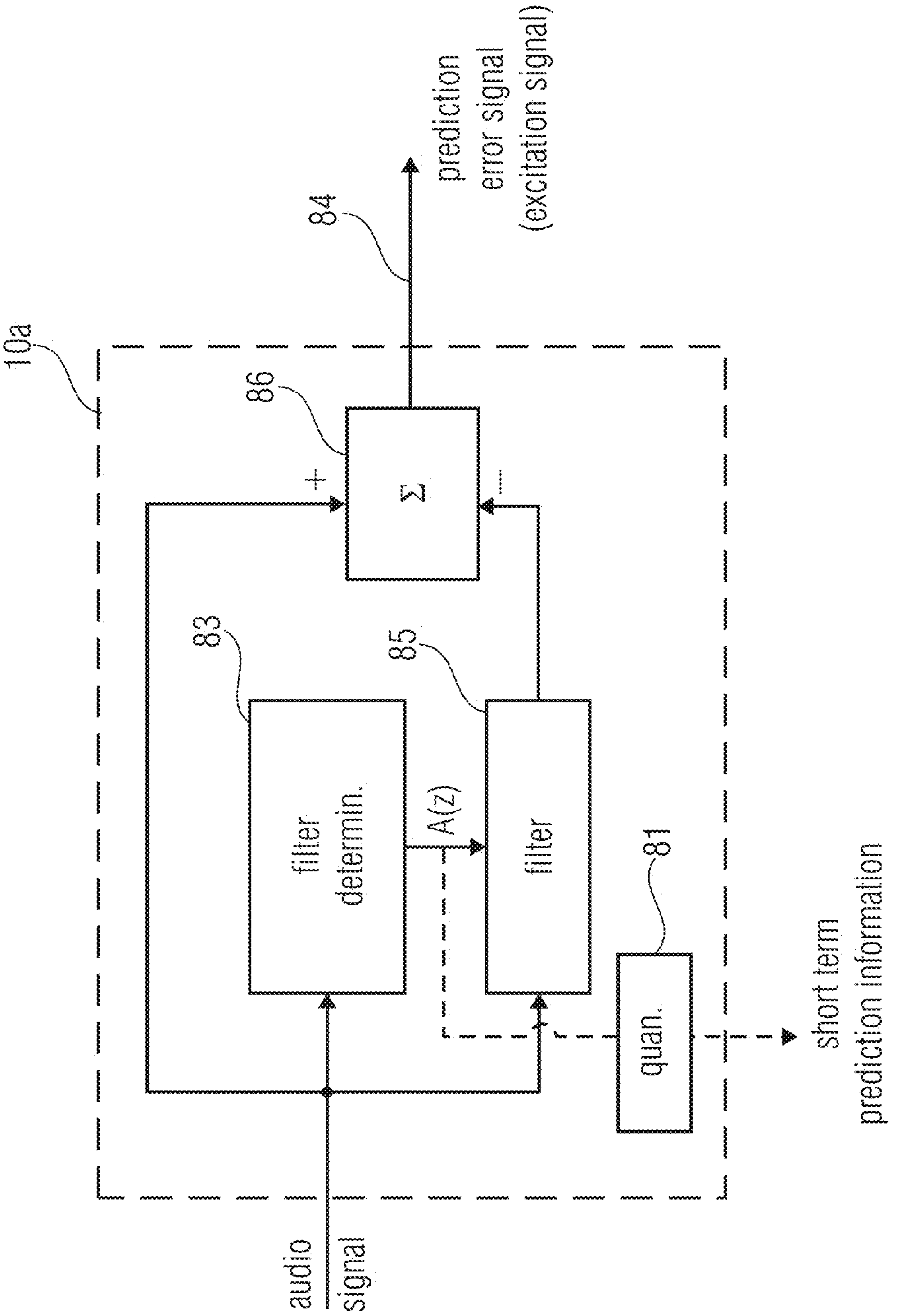
FIG. 7*e* illustrates an encoder-side LPC stage providing short-term prediction information and the prediction error (excitation) signal.
Figure 7F:
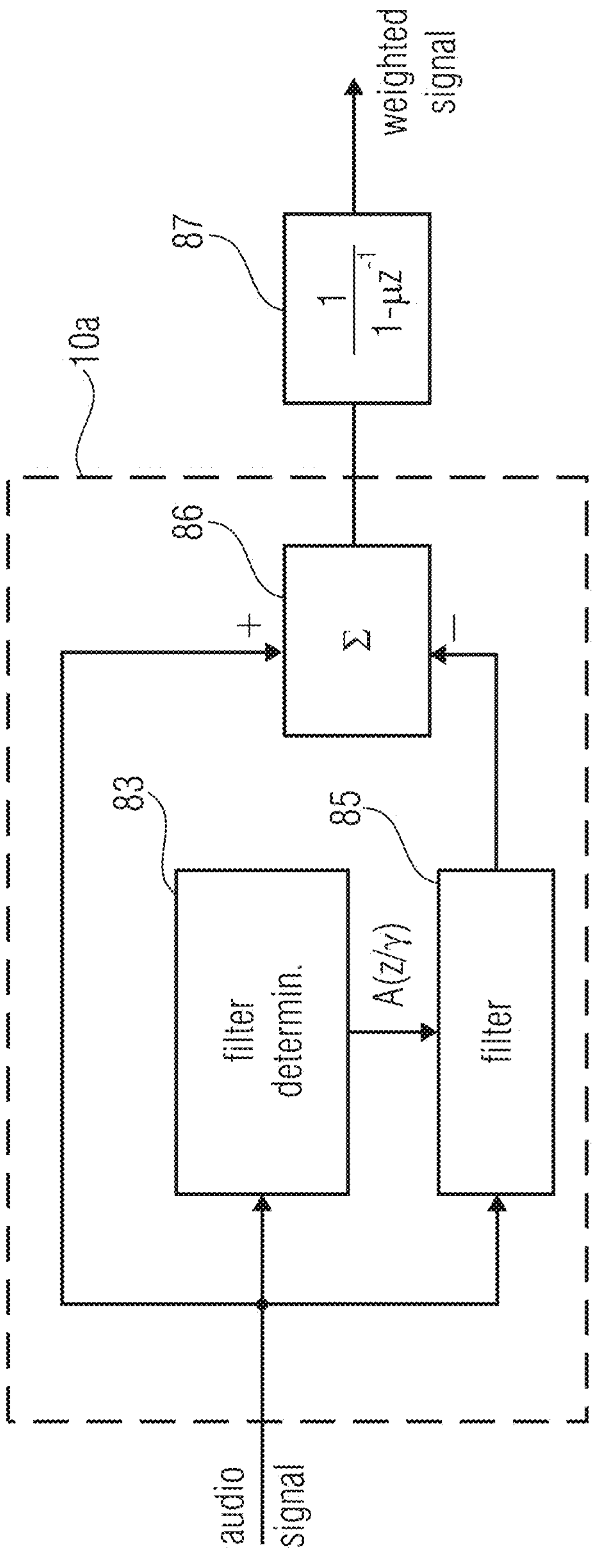
FIG. 7*f* illustrates a further embodiment of an LPC device for generating a weighted signal.

The LPC device generally outputs an LPC domain signal, which can be any signal in the LPC domain such as the excitation signal in FIG. 7*e* or a weighted signal in FIG. 7*f* or any other signal, which has been generated by applying LPC filter coefficients to an audio signal. Furthermore, an LPC device can also determine these coefficients and can also quantize/encode these coefficients.

The decision in the decision stage can be signal-adaptive so that the decision stage performs a music/speech discrimination and controls the switch 200 in such a way that music signals are input into the upper branch 400, and speech signals are input into the lower branch 500. In one embodiment, the decision stage is feeding its decision information into an output bit stream so that a decoder can use this decision information in order to perform the correct decoding operations.

Figure 1B:
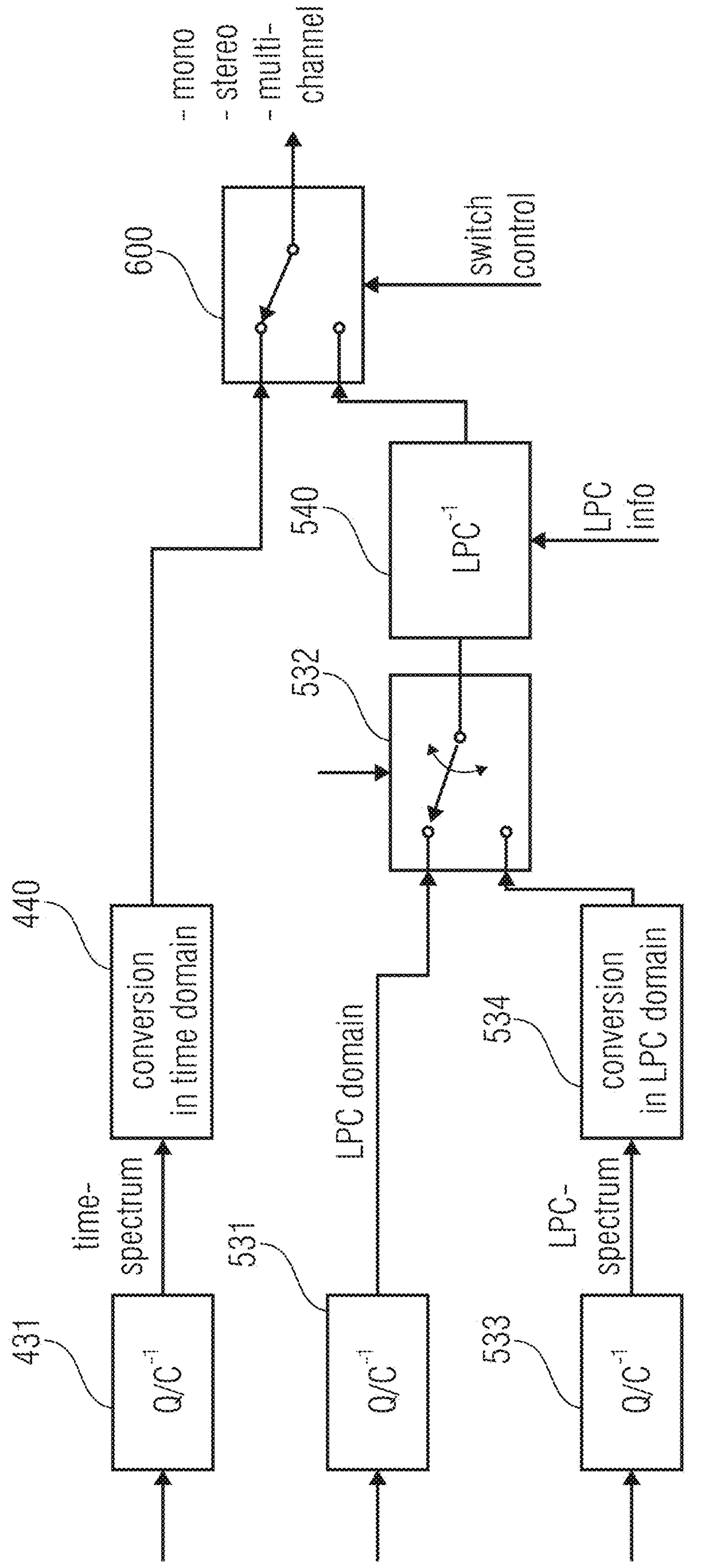
FIG. 1*b* is a block diagram of a decoding scheme in accordance with the first aspect of the present invention.

Such a decoder is illustrated in FIG. 1*b*. The signal output by the spectral audio encoder 421 is, after transmission, input into a spectral audio decoder 431. The output of the spectral audio decoder 431 is input into a time-domain converter 440. Analogously, the output of the LPC domain encoding branch 500 of FIG. 1*a* received on the decoder side and processed by elements 531, 533, 534, and 532 for obtaining an LPC excitation signal. The LPC excitation signal is input into an LPC synthesis stage 540, which receives, as a further input, the LPC information generated by the corresponding LPC analysis stage 510. The output of the time-domain converter 440 and/or the output of the LPC synthesis stage 540 are input into a switch 600. The switch 600 is controlled via a switch control signal which was, for example, generated by the decision stage 300, or which was externally provided such as by a creator of the original mono signal, stereo signal or multi-channel signal. The output of the switch 600 is a complete mono signal, stereo signal or multichannel signal.

The input signal into the switch 200 and the decision stage 300 can be a mono signal, a stereo signal, a multi-channel signal or generally an audio signal. Depending on the decision which can be derived from the switch 200 input signal or from any external source such as a producer of the original audio signal underlying the signal input into stage 200, the switch switches between the frequency encoding branch 400 and the LPC encoding branch 500. The frequency encoding branch 400 comprises a spectral conversion stage 410 and a subsequently connected quantizing/coding stage 421. The quantizing/coding stage can include any of the functionalities as known from modern frequency-domain encoders such as the AAC encoder. Furthermore, the quantization operation in the quantizing/coding stage 421 can be controlled via a psychoacoustic module which generates psychoacoustic information such as a psychoacoustic masking threshold over the frequency, where this information is input into the stage 421.

In the LPC encoding branch, the switch output signal is processed via an LPC analysis stage 510 generating LPC side info and an LPC-domain signal. The excitation encoder inventively comprises an additional switch for switching the further processing of the LPC-domain signal between a quantization/coding operation 522 in the LPC-domain or a quantization/coding stage 524, which is processing values in the LPC-spectral domain. To this end, a spectral converter 523 is provided at the input of the quantizing/coding stage 524. The switch 521 is controlled in an open loop fashion or a closed loop fashion depending on specific settings as, for example, described in the AMR-WB+ technical specification.

For the closed loop control mode, the encoder additionally includes an inverse quantizer/coder 531 for the LPC domain signal, an inverse quantizer/coder 533 for the LPC spectral domain signal and an inverse spectral converter 534 for the output of item 533. Both encoded and again decoded signals in the processing branches of the second encoding branch are input into the switch control device 525. In the switch control device 525, these two output signals are compared to each other and/or to a target function or a target function is calculated which may be based on a comparison of the distortion in both signals so that the signal having the lower distortion is used for deciding, which position the switch 521 should take. Alternatively, in case both branches provide non-constant bit rates, the branch providing the lower bit rate might be selected even when the signal to noise ratio of this branch is lower than the signal to noise ratio of the other branch. Alternatively, the target function could use, as an input, the signal to noise ratio of each signal and a bit rate of each signal and/or additional criteria in order to find the best decision for a specific goal. If, for example, the goal is such that the bit rate should be as low as possible, then the target function would heavily rely on the bit rate of the two signals output by the elements 531, 534. However, when the main goal is to have the best quality for a certain bit rate, then the switch control 525 might, for example, discard each signal which is above the allowed bit rate and when both signals are below the allowed bit rate, the switch control would select the signal having the better signal to noise ratio, i.e., having the smaller quantization/coding distortions.

The decoding scheme in accordance with the present invention is, as stated before, illustrated in FIG. 1*b*. For each of the three possible output signal kinds, a specific decoding/re-quantizing stage 431, 531 or 533 exists. While stage 431 outputs a time-spectrum which is converted into the time-domain using the frequency/time converter 440, stage 531 outputs an LPC-domain signal, and item 533 outputs an LPC-spectrum. In order to make sure that the input signals into switch 532 are both in the LPC-domain, the LPC-spectrum/LPC-converter 534 is provided. The output data of the switch 532 is transformed back into the time-domain using an LPC synthesis stage 540, which is controlled via encoder-side generated and transmitted LPC information. Then, subsequent to block 540, both branches have time-domain information which is switched in accordance with a switch control signal in order to finally obtain an audio signal such as a mono signal, a stereo signal or a multi-channel signal, which depends on the signal input into the encoding scheme of FIG. 1*a*.

Figure 1C:
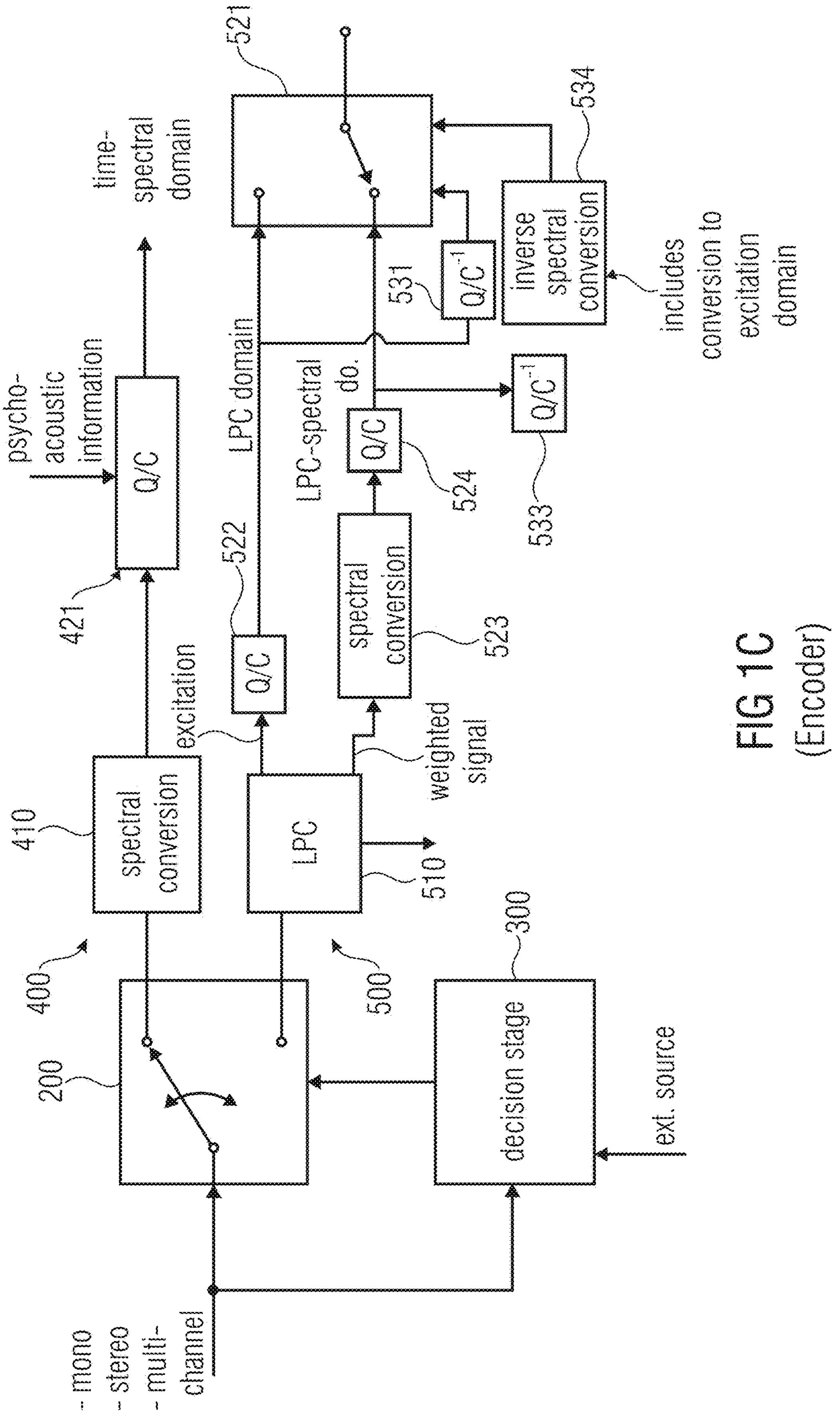
FIG. 1*c* is a block diagram of an encoding scheme in accordance with a further aspect of the present invention.
Figure 4A:
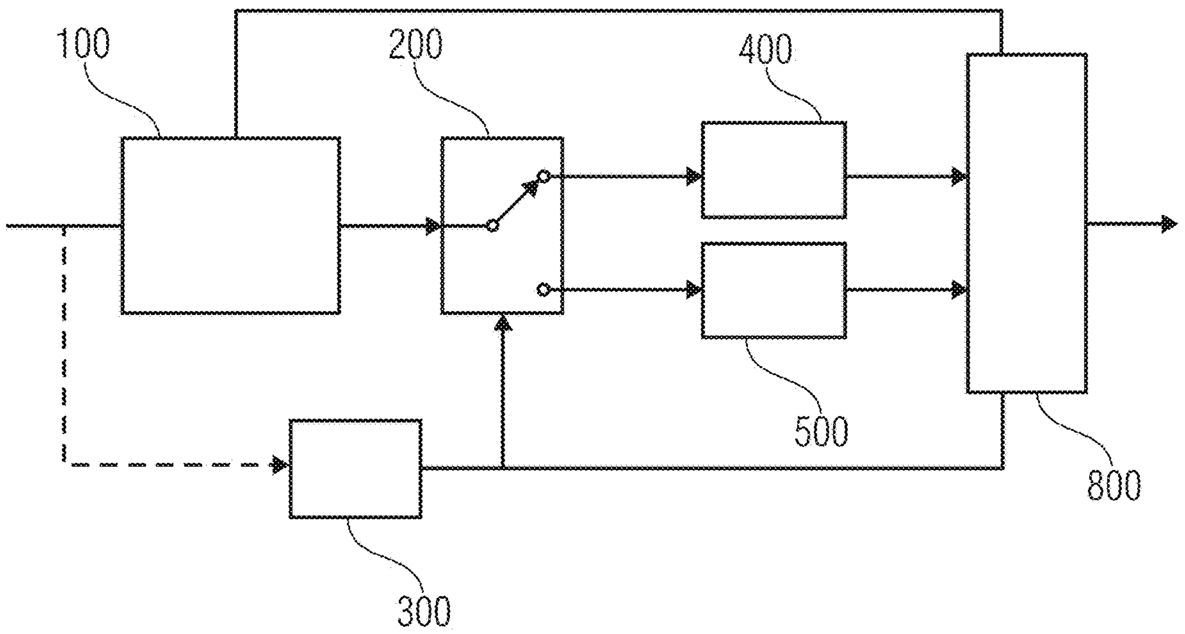
FIG. 4*a* illustrates a block diagram with a switch positioned before the encoding branches.
Figure 4B:
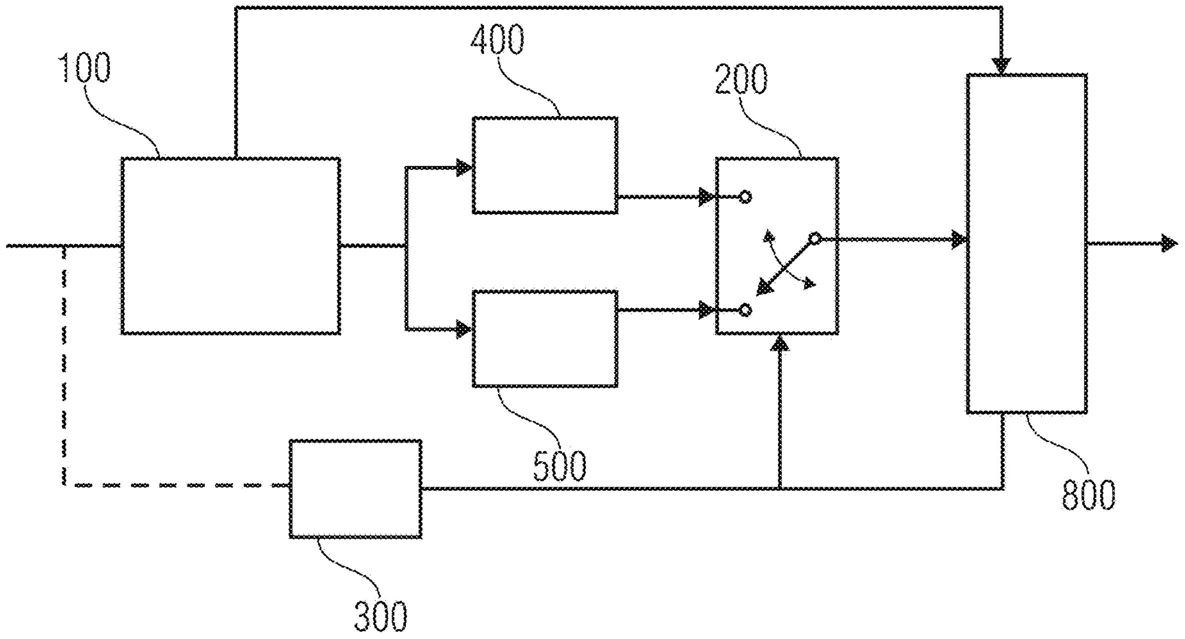
FIG. 4*b* illustrates a block diagram of an encoding scheme with the switch positioned subsequent to encoding the branches.

FIG. 1*c* illustrates a further embodiment with a different arrangement of the switch 521 similar to the principle of FIG. 4*b*.

Figure 2A:
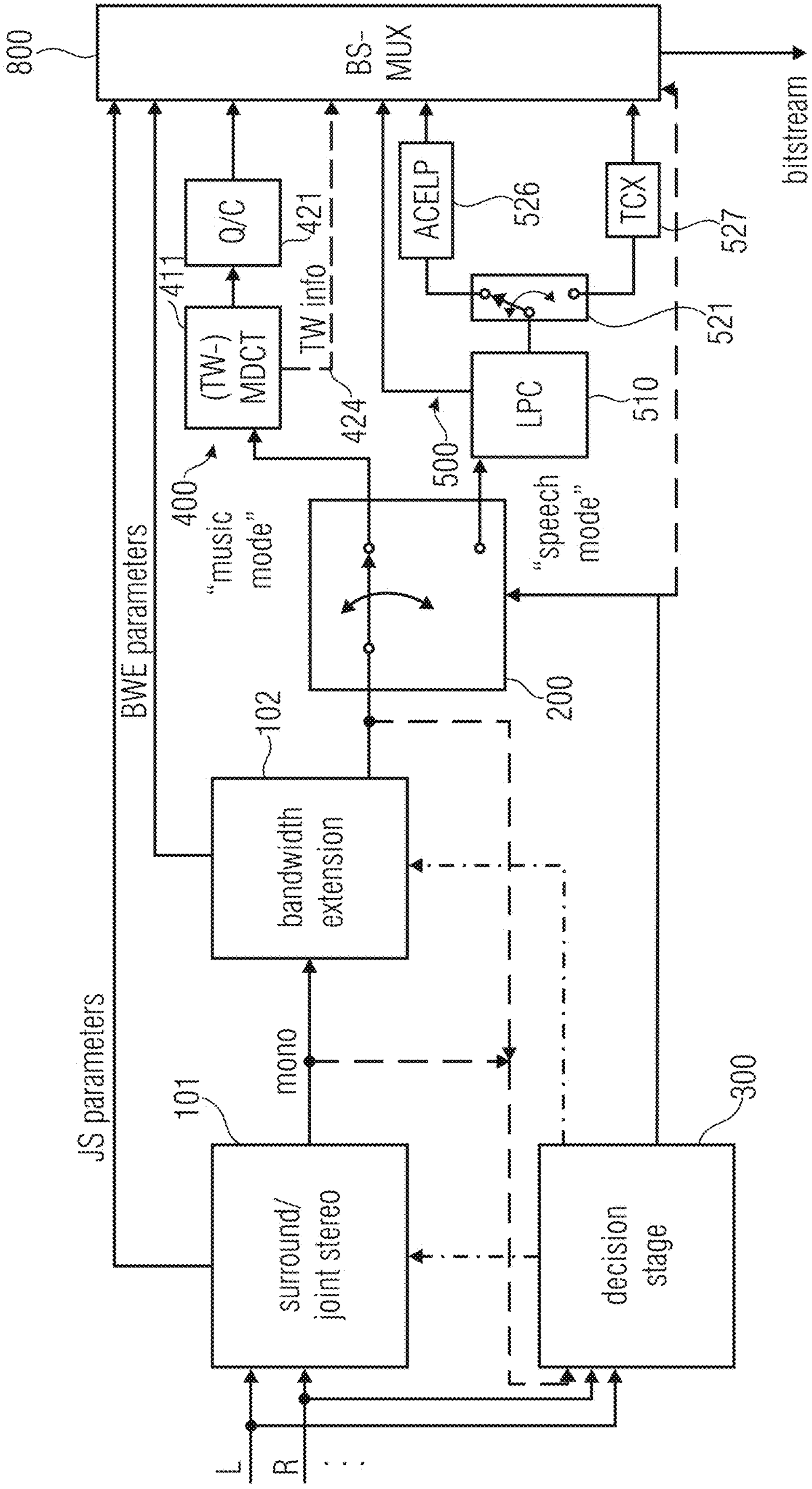
FIG. 2*a* is a block diagram of an encoding scheme in accordance with a second aspect of the present invention.

FIG. 2*a* illustrates an encoding scheme in accordance with a second aspect of the invention. A common preprocessing scheme connected to the switch 200 input may comprise a surround/joint stereo block 101 which generates, as an output, joint stereo parameters and a mono output signal, which is generated by downmixing the input signal which is a signal having two or more channels. Generally, the signal at the output of block 101 can also be a signal having more channels, but due to the downmixing functionality of block 101, the number of channels at the output of block 101 will be smaller than the number of channels input into block 101.

The common preprocessing scheme may comprise alternatively to the block 101 or in addition to the block 101 a bandwidth extension stage 102. In the FIG. 2*a* embodiment, the output of block 101 is input into the bandwidth extension block 102 which, in the encoder of FIG. 2*a*, outputs a band-limited signal such as the low band signal or the low pass signal at its output. This signal is downsampled (e.g. by a factor of two) as well. Furthermore, for the high band of the signal input into block 102, bandwidth extension parameters such as spectral envelope parameters, inverse filtering parameters, noise floor parameters etc. as known from HE-AAC profile of MPEG-4 are generated and forwarded to a bitstream multiplexer 800.

The decision stage 300 receives the signal input into block 101 or input into block 102 in order to decide between, for example, a music mode or a speech mode. In the music mode, the upper encoding branch 400 is selected, while, in the speech mode, the lower encoding branch 500 is selected. The decision stage additionally controls the joint stereo block 101 and/or the bandwidth extension block 102 to adapt the functionality of these blocks to the specific signal. Thus, when the decision stage determines that a certain time portion of the input signal is of the first mode such as the music mode, then specific features of block 101 and/or block 102 can be controlled by the decision stage 300. Alternatively, when the decision stage 300 determines that the signal is in a speech mode or, generally, in a second LPC-domain mode, then specific features of blocks 101 and 102 can be controlled in accordance with the decision stage output.

The spectral conversion of the coding branch 400 is done using an MDCT operation which, even more advantageous, is the time-warped MDCT operation, where the strength or, generally, the warping strength can be controlled between zero and a high warping strength. In a zero warping strength, the MDCT operation in block 411 is a straight-forward MDCT operation known in the art. The time warping strength together with time warping side information can be transmitted/input into the bitstream multiplexer 800 as side information.

In the LPC encoding branch, the LPC-domain encoder may include an ACELP core 526 calculating a pitch gain, a pitch lag and/or codebook information such as a codebook index and gain. The TCX mode as known from 3GPP TS 26.290 incurs a processing of a perceptually weighted signal in the transform domain. A Fourier transformed weighted signal is quantized using a split multi-rate lattice quantization (algebraic VQ) with noise factor quantization. A transform is calculated in 1024, 512, or 256 sample windows. The excitation signal is recovered by inverse filtering the quantized weighted signal through an inverse weighting filter.

In the first coding branch 400, a spectral converter comprises a specifically adapted MDCT operation having certain window functions followed by a quantization/entropy encoding stage which may consist of a single vector quantization stage, but advantageously is a combined scalar quantizer/entropy coder similar to the quantizer/coder in the frequency domain coding branch, i.e., in item 421 of FIG. 2*a*.

In the second coding branch, there is the LPC block 510 followed by a switch 521, again followed by an ACELP block 526 or an TCX block 527. ACELP is described in 3GPP TS 26.190 and TCX is described in 3GPP TS 26.290. Generally, the ACELP block 526 receives an LPC excitation signal as calculated by a procedure as described in FIG. 7*e*. The TCX block 527 receives a weighted signal as generated by FIG. 7*f*.

In TCX, the transform is applied to the weighted signal computed by filtering the input signal through an LPC-based weighting filter. The weighting filter used embodiments of the invention is given by $(1-A(z/\gamma))/(1-\mu z^{-1})$. Thus, the weighted signal is an LPC domain signal and its transform is an LPC-spectral domain. The signal processed by ACELP block 526 is the excitation signal and is different from the signal processed by the block 527, but both signals are in the LPC domain.

Figure 2B:
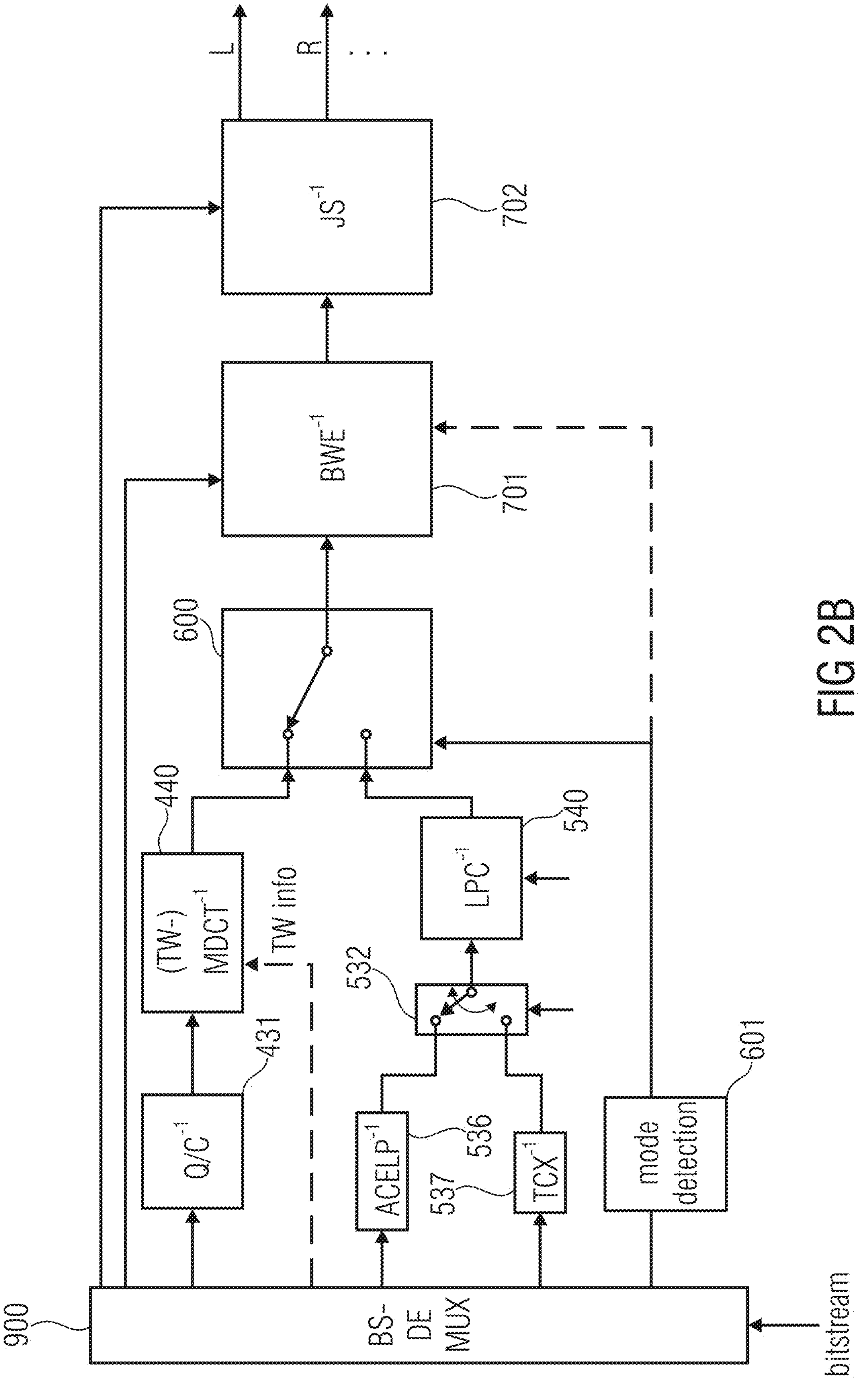
FIG. 2*b* is a schematic diagram of a decoding scheme in accordance with the second aspect of the present invention.

At the decoder side illustrated in FIG. 2*b*, after the inverse spectral transform in block 537, the inverse of the weighting filter is applied, that is $(1-\mu z^{-1})/(1-A(z/\gamma))$. Then, the signal is filtered through $(1-A(z))$ to go to the LPC excitation domain. Thus, the conversion to LPC domain block 540 and the $TCX^{-1}$ block 537 include inverse transform and then filtering through $$\frac{(1-\mu z^{-1})}{(1-A(z/\gamma))}(1-A(z))$$

to convert from the weighted domain to the excitation domain.

Although item 510 in FIGS. 1*a*, 1*c*, 2*a*, 2*c* illustrates a single block, block 510 can output different signals as long as these signals are in the LPC domain. The actual mode of block 510 such as the excitation signal mode or the weighted signal mode can depend on the actual switch state. Alternatively, the block 510 can have two parallel processing devices, where one device is implemented similar to FIG. 7*e* and the other device is implemented as FIG. 7*f*. Hence, the LPC domain at the output of 510 can represent either the LPC excitation signal or the LPC weighted signal or any other LPC domain signal.

Figure 2C:
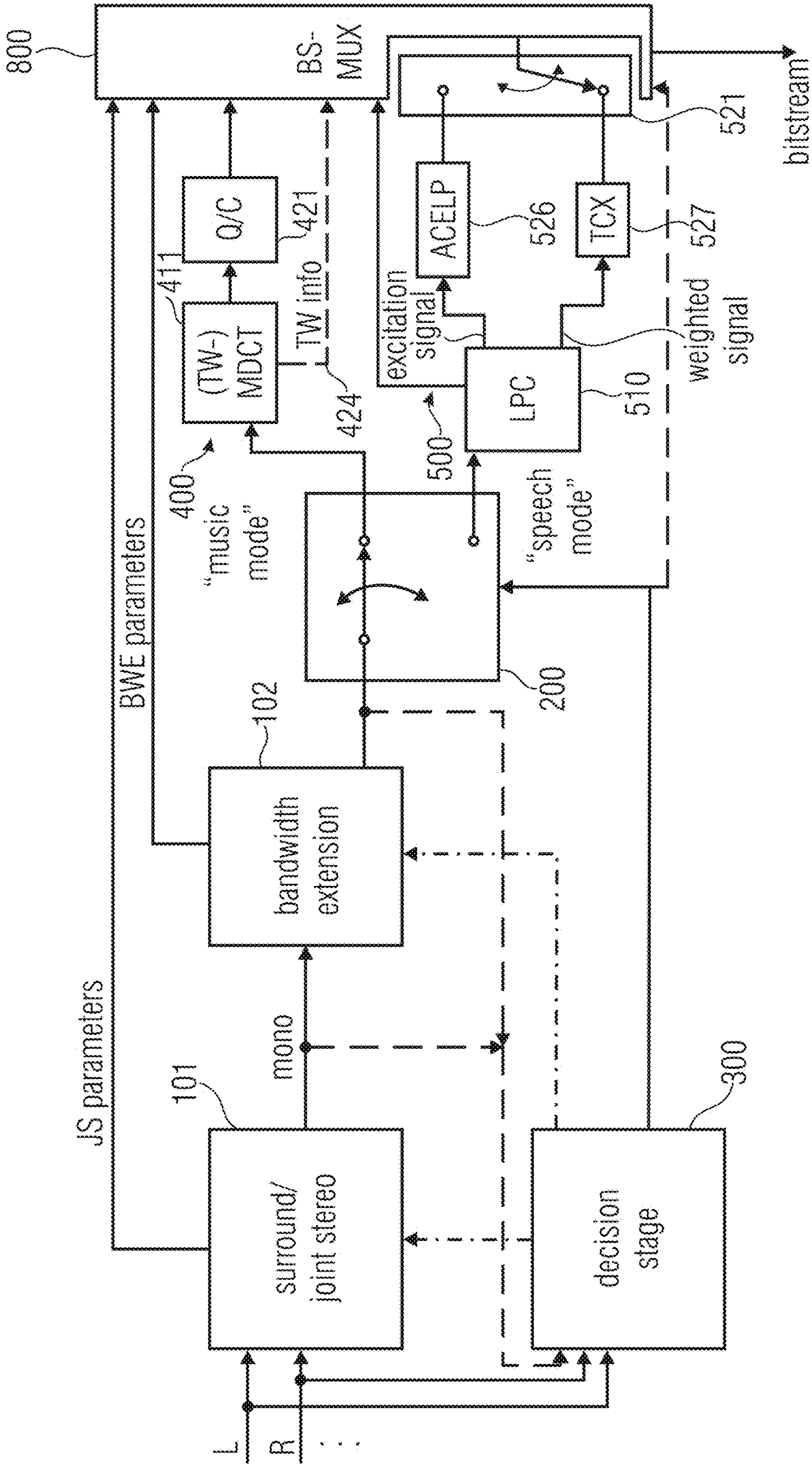
FIG. 2*c* is a block diagram of an encoding scheme in accordance with a further aspect of the present invention

In the second encoding branch (ACELP/TCX) of FIG. 2*a* or 2*c*, the signal is preemphasized through a filter $1-0.68z^{-1}$ before encoding. At the ACELP/TCX decoder in FIG. 2*b* the synthesized signal is deemphasized with the filter $1/(1-0.68z^{-1})$. The preemphasis can be part of the LPC block 510 where the signal is preemphasized before LPC analysis and quantization. Similarly, deemphasis can be part of the LPC synthesis block $LPC^{-1}$ 540.

FIG. 2*c* illustrates a further embodiment for the implementation of FIG. 2*a*, but with a different arrangement of the switch 521 similar to the principle of FIG. 4*b*.

In an embodiment, the first switch 200 (see FIG. 1*a* or 2*a*) is controlled through an open-loop decision (as in FIG. 4*a*) and the second switch is controlled through a closed-loop decision (as in FIG. 4*b*).

For example, FIG. 2*c*, has the second switch placed after the ACELP and TCX branches as in FIG. 4*b*. Then, in the first processing branch, the first LPC domain represents the LPC excitation, and in the second processing branch, the second LPC domain represents the LPC weighted signal. That is, the first LPC domain signal is obtained by filtering through $(1-A(z))$ to convert to the LPC residual domain, while the second LPC domain signal is obtained by filtering through the filter $(1-A(z/\gamma))/(1-\mu z^{-1})$ to convert to the LPC weighted domain.

FIG. 2*b* illustrates a decoding scheme corresponding to the encoding scheme of FIG. 2*a*. The bitstream generated by bitstream multiplexer 800 of FIG. 2*a* is input into a bitstream demultiplexer 900. Depending on an information derived for example from the bitstream via a mode detection block 601, a decoder-side switch 600 is controlled to either forward signals from the upper branch or signals from the lower branch to the bandwidth extension block 701. The bandwidth extension block 701 receives, from the bitstream demultiplexer 900, side information and, based on this side information and the output of the mode decision 601, reconstructs the high band based on the low band output by switch 600.

The full band signal generated by block 701 is input into the joint stereo/surround processing stage 702, which reconstructs two stereo channels or several multi-channels. Generally, block 702 will output more channels than were input into this block. Depending on the application, the input into block 702 may even include two channels such as in a stereo mode and may even include more channels as long as the output by this block has more channels than the input into this block.

The switch 200 has been shown to switch between both branches so that only one branch receives a signal to process and the other branch does not receive a signal to process. In an alternative embodiment, however, the switch may also be arranged subsequent to for example the audio encoder 421 and the excitation encoder 522, 523, 524, which means that both branches 400, 500 process the same signal in parallel. In order to not double the bitrate, however, only the signal output by one of those encoding branches 400 or 500 is selected to be written into the output bitstream. The decision stage will then operate so that the signal written into the bitstream minimizes a certain cost function, where the cost function can be the generated bitrate or the generated perceptual distortion or a combined rate/distortion cost function. Therefore, either in this mode or in the mode illustrated in the Figures, the decision stage can also operate in a closed loop mode in order to make sure that, finally, only the encoding branch output is written into the bitstream which has for a given perceptual distortion the lowest bitrate or, for a given bitrate, has the lowest perceptual distortion. In the closed loop mode, the feedback input may be derived from outputs of the three quantizer/scaler blocks 421, 522 and 524 in FIG. 1*a*.

In the implementation having two switches, i.e., the first switch 200 and the second switch 521, it is advantageous that the time resolution for the first switch is lower than the time resolution for the second switch. Stated differently, the blocks of the input signal into the first switch, which can be switched via a switch operation are larger than the blocks switched by the second switch operating in the LPC-domain. Exemplarily, the frequency domain/LPC-domain switch 200 may switch blocks of a length of 1024 samples, and the second switch 521 can switch blocks having 256 samples each.

Although some of the FIGS. 1*a* through 10*b* are illustrated as block diagrams of an apparatus, these figures simultaneously are an illustration of a method, where the block functionalities correspond to the method steps.

Figure 3A:
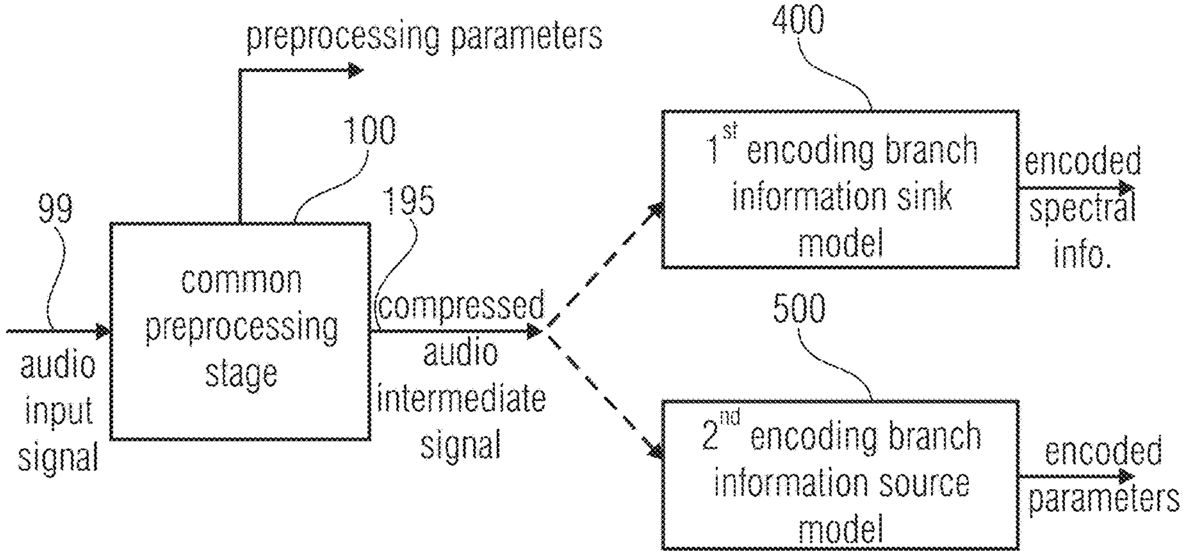
FIG. 3*a* illustrates a block diagram of an encoding scheme in accordance with a further aspect of the present invention.

FIG. 3*a* illustrates an audio encoder for generating an encoded audio signal as an output of the first encoding branch 400 and a second encoding branch 500. Furthermore, the encoded audio signal includes side information such as pre-processing parameters from the common pre-processing stage or, as discussed in connection with preceding Figs., switch control information.

The first encoding branch is operative in order to encode an audio intermediate signal 195 in accordance with a first coding algorithm, wherein the first coding algorithm has an information sink model. The first encoding branch 400 generates the first encoder output signal which is an encoded spectral information representation of the audio intermediate signal 195.

Furthermore, the second encoding branch 500 is adapted for encoding the audio intermediate signal 195 in accordance with a second encoding algorithm, the second coding algorithm having an information source model and generating, in a second encoder output signal, encoded parameters for the information source model representing the intermediate audio signal.

The audio encoder furthermore comprises the common pre-processing stage for pre-processing an audio input signal 99 to obtain the audio intermediate signal 195. Specifically, the common pre-processing stage is operative to process the audio input signal 99 so that the audio intermediate signal 195, i.e., the output of the common pre-processing algorithm is a compressed version of the audio input signal.

A method of audio encoding for generating an encoded audio signal, comprises a step of encoding 400 an audio intermediate signal 195 in accordance with a first coding algorithm, the first coding algorithm having an information sink model and generating, in a first output signal, encoded spectral information representing the audio signal; a step of encoding 500 an audio intermediate signal 195 in accordance with a second coding algorithm, the second coding algorithm having an information source model and generating, in a second output signal, encoded parameters for the information source model representing the intermediate signal 195, and a step of commonly pre-processing 100 an audio input signal 99 to obtain the audio intermediate signal 195, wherein, in the step of commonly pre-processing the audio input signal 99 is processed so that the audio intermediate signal 195 is a compressed version of the audio input signal 99, wherein the encoded audio signal includes, for a certain portion of the audio signal either the first output signal or the second output signal. The method includes the further step encoding a certain portion of the audio intermediate signal either using the first coding algorithm or using the second coding algorithm or encoding the signal using both algorithms and outputting in an encoded signal either the result of the first coding algorithm or the result of the second coding algorithm.

Generally, the audio encoding algorithm used in the first encoding branch 400 reflects and models the situation in an audio sink. The sink of an audio information is normally the human ear. The human ear can be modeled as a frequency analyzer. Therefore, the first encoding branch outputs encoded spectral information. The first encoding branch furthermore includes a psychoacoustic model for additionally applying a psychoacoustic masking threshold. This psychoacoustic masking threshold is used when quantizing audio spectral values where the quantization is performed such that a quantization noise is introduced by quantizing the spectral audio values, which are hidden below the psychoacoustic masking threshold.

The second encoding branch represents an information source model, which reflects the generation of audio sound. Therefore, information source models may include a speech model which is reflected by an LPC analysis stage, i.e., by transforming a time domain signal into an LPC domain and by subsequently processing the LPC residual signal, i.e., the excitation signal. Alternative sound source models, however, are sound source models for representing a certain instrument or any other sound generators such as a specific sound source existing in real world. A selection between different sound source models can be performed when several sound source models are available, for example based on an SNR calculation, i.e., based on a calculation, which of the source models is the best one suitable for encoding a certain time portion and/or frequency portion of an audio signal. The switch between encoding branches is performed in the time domain, i.e., that a certain time portion is encoded using one model and a certain different time portion of the intermediate signal is encoded using the other encoding branch.

Information source models are represented by certain parameters. Regarding the speech model, the parameters are LPC parameters and coded excitation parameters, when a modern speech coder such as AMR-WB+ is considered. The AMR-WB+ comprises an ACELP encoder and a TCX encoder. In this case, the coded excitation parameters can be global gain, noise floor, and variable length codes.

Figure 3B:
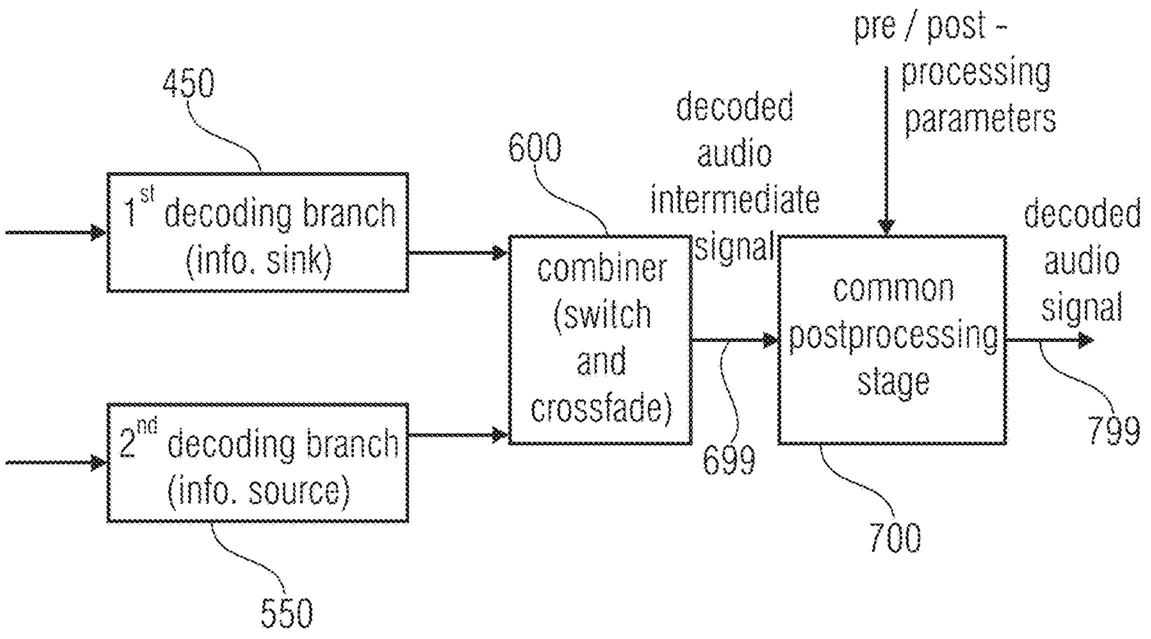
FIG. 3*b* illustrates a block diagram of a decoding scheme in accordance with the further aspect of the present invention.

FIG. **3*b* illustrates a decoder corresponding to the encoder illustrated in FIG. 3*a*. Generally, FIG. 3*b* illustrates an audio decoder for decoding an encoded audio signal to obtain a decoded audio signal 799. The decoder includes the first decoding branch 450 for decoding an encoded signal encoded in accordance with a first coding algorithm having an information sink model. The audio decoder furthermore includes a second decoding branch 550 for decoding an encoded information signal encoded in accordance with a second coding algorithm having an information source model. The audio decoder furthermore includes a combiner for combining output signals from the first decoding branch 450 and the second decoding branch 550 to obtain a combined signal. The combined signal which is illustrated in FIG. 3*b* as the decoded audio intermediate signal 699 is input into a common post processing stage for post processing the decoded audio intermediate signal 699, which is the combined signal output by the combiner 600 so that an output signal of the common pre-processing stage is an expanded version of the combined signal. Thus, the decoded audio signal 799 has an enhanced information content compared to the decoded audio intermediate signal 699**. This information expansion is provided by the common post processing stage with the help of pre/post processing parameters which can be transmitted from an encoder to a decoder, or which can be derived from the decoded audio intermediate signal itself. Pre/post processing parameters are transmitted from an encoder to a decoder, since this procedure allows an improved quality of the decoded audio signal.

FIG. **3*c* illustrates an audio encoder for encoding an audio input signal 195, which may be equal to the intermediate audio signal 195 of FIG. 3*a* in accordance with the embodiment of the present invention. The audio input signal 195** is present in a first domain which can, for example, be the time domain but which can also be any other domain such as a frequency domain, an LPC domain, an LPC spectral domain or any other domain. Generally, the conversion from one domain to the other domain is performed by a conversion algorithm such as any of the well-known time/frequency conversion algorithms or frequency/time conversion algorithms.

An alternative transform from the time domain, for example in the LPC domain is the result of LPC filtering a time domain signal which results in an LPC residual signal or excitation signal. Any other filtering operations producing a filtered signal which has an impact on a substantial number of signal samples before the transform can be used as a transform algorithm as the case may be. Therefore, weighting an audio signal using an LPC based weighting filter is a further transform, which generates a signal in the LPC domain. In a time/frequency transform, the modification of a single spectral value will have an impact on all time domain values before the transform. Analogously, a modification of any time domain sample will have an impact on each frequency domain sample. Similarly, a modification of a sample of the excitation signal in an LPC domain situation will have, due to the length of the LPC filter, an impact on a substantial number of samples before the LPC filtering. Similarly, a modification of a sample before an LPC transformation will have an impact on many samples obtained by this LPC transformation due to the inherent memory effect of the LPC filter.

Figure 3C:
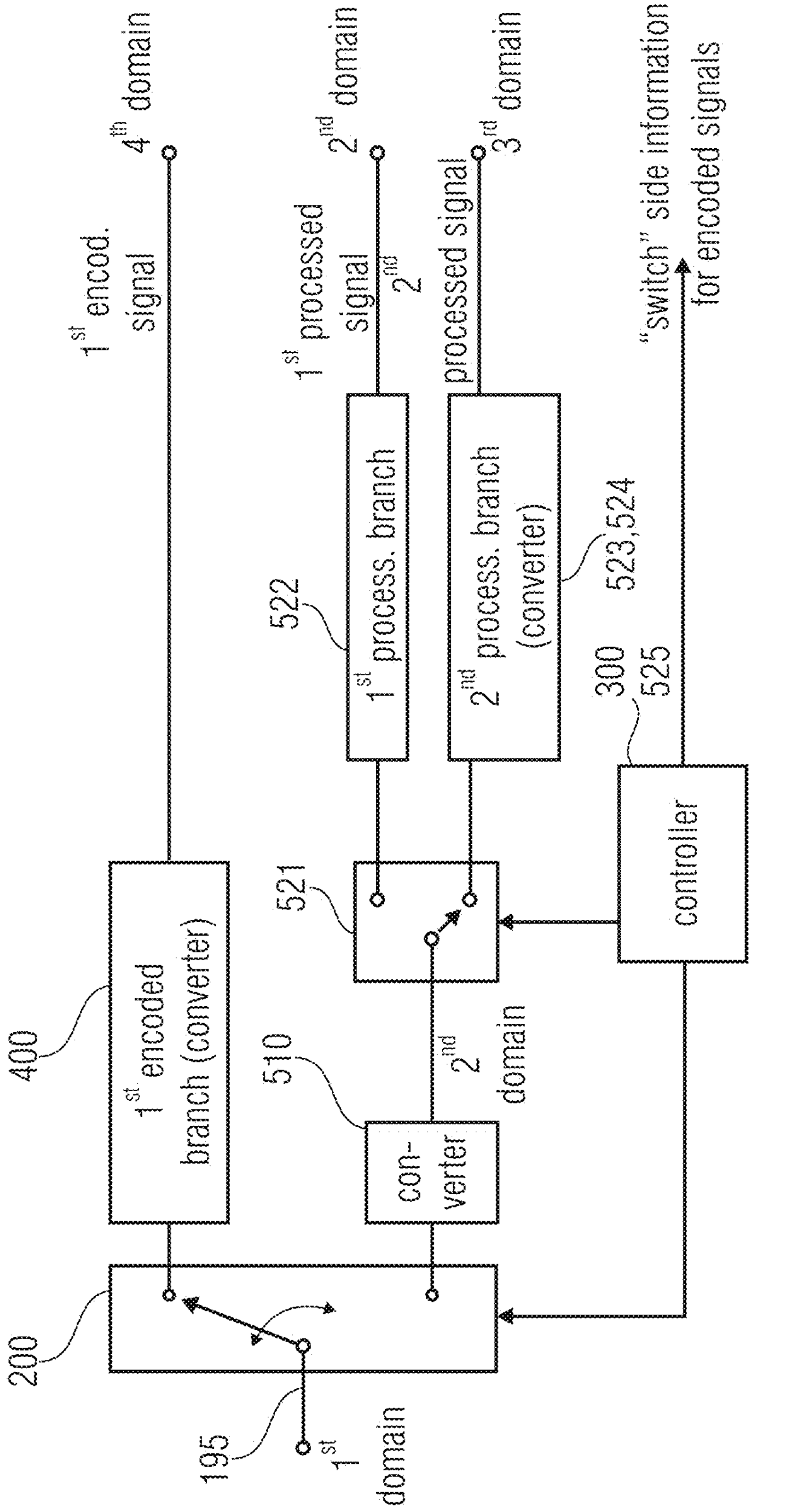
FIG. 3*c* illustrates a schematic representation of the encoding apparatus/method with cascaded switches.

The audio encoder of FIG. 3*c* includes a first coding branch 400 which generates a first encoded signal. This first encoded signal may be in a fourth domain which is, in the embodiment, the time-spectral domain, i.e., the domain which is obtained when a time domain signal is processed via a time/frequency conversion.

Therefore, the first coding branch 400 for encoding an audio signal uses a first coding algorithm to obtain a first encoded signal, where this first coding algorithm may or may not include a time/frequency conversion algorithm.

The audio encoder furthermore includes a second coding branch 500 for encoding an audio signal. The second coding branch 500 uses a second coding algorithm to obtain a second encoded signal, which is different from the first coding algorithm.

The audio encoder furthermore includes a first switch 200 for switching between the first coding branch 400 and the second coding branch 500 so that for a portion of the audio input signal, either the first encoded signal at the output of block 400 or the second encoded signal at the output of the second encoding branch is included in an encoder output signal. Thus, when for a certain portion of the audio input signal 195, the first encoded signal in the fourth domain is included in the encoder output signal, the second encoded signal which is either the first processed signal in the second domain or the second processed signal in the third domain is not included in the encoder output signal. This makes sure that this encoder is bit rate efficient. In embodiments, any time portions of the audio signal which are included in two different encoded signals are small compared to a frame length of a frame as will be discussed in connection with FIG. 3*e*. These small portions are useful for a cross fade from one encoded signal to the other encoded signal in the case of a switch event in order to reduce artifacts that might occur without any cross fade. Therefore, apart from the cross-fade region, each time domain block is represented by an encoded signal of only a single domain.

As illustrated in FIG. 3*c*, the second coding branch 500 comprises a converter 510 for converting the audio signal in the first domain, i.e., signal 195 into a second domain. Furthermore, the second coding branch 500 comprises a first processing branch 522 for processing an audio signal in the second domain to obtain a first processed signal which is also in the second domain so that the first processing branch 522 does not perform a domain change.

The second encoding branch 500 furthermore comprises a second processing branch 523, 524 which converts the audio signal in the second domain into a third domain, which is different from the first domain and which is also different from the second domain and which processes the audio signal in the third domain to obtain a second processed signal at the output of the second processing branch 523, 524.

Furthermore, the second coding branch comprises a second switch 521 for switching between the first processing branch 522 and the second processing branch 523, 524 so that, for a portion of the audio signal input into the second coding branch, either the first processed signal in the second domain or the second processed signal in the third domain is in the second encoded signal.

Figure 3D:
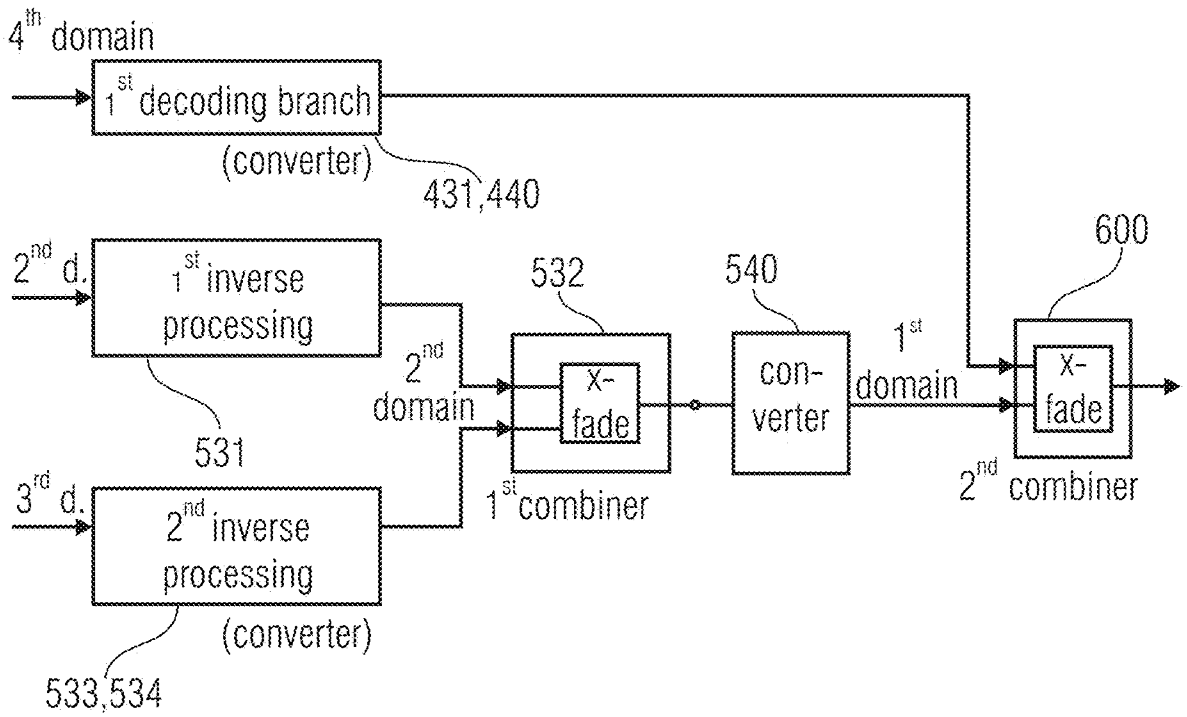
FIG. 3*d* illustrates a schematic diagram of an apparatus or method for decoding, in which cascaded combiners are used.

FIG. 3*d* illustrates a corresponding decoder for decoding an encoded audio signal generated by the encoder of FIG. 3*c*. Generally, each block of the first domain audio signal is represented by either a second domain signal, a third domain signal or a fourth domain encoded signal apart from an optional cross fade region which is short compared to the length of one frame in order to obtain a system which is as much as possible at the critical sampling limit. The encoded audio signal includes the first coded signal, a second coded signal in a second domain and a third coded signal in a third domain, wherein the first coded signal, the second coded signal and the third coded signal all relate to different time portions of the decoded audio signal and wherein the second domain, the third domain and the first domain for a decoded audio signal are different from each other.

The decoder comprises a first decoding branch for decoding based on the first coding algorithm. The first decoding branch is illustrated at 431, 440 in FIG. 3*d* and comprises a frequency/time converter. The first coded signal is in a fourth domain and is converted into the first domain which is the domain for the decoded output signal.

The decoder of FIG. 3*d* furthermore comprises a second decoding branch which comprises several elements. These elements are a first inverse processing branch 531 for inverse processing the second coded signal to obtain a first inverse processed signal in the second domain at the output of block 531. The second decoding branch furthermore comprises a second inverse processing branch 533, 534 for inverse processing a third coded signal to obtain a second inverse processed signal in the second domain, where the second inverse processing branch comprises a converter for converting from the third domain into the second domain.

The second decoding branch furthermore comprises a first combiner 532 for combining the first inverse processed signal and the second inverse processed signal to obtain a signal in the second domain, where this combined signal is, at the first time instant, only influenced by the first inverse processed signal and is, at a later time instant, only influenced by the second inverse processed signal.

The second decoding branch furthermore comprises a converter 540 for converting the combined signal to the first domain.

Finally, the decoder illustrated in FIG. 3*d* comprises a second combiner 600 for combining the decoded first signal from block 431, 440 and the converter 540 output signal to obtain a decoded output signal in the first domain. Again, the decoded output signal in the first domain is, at the first time instant, only influenced by the signal output by the converter 540 and is, at a later time instant, only influenced by the first decoded signal output by block 431, 440.

Figure 3E:
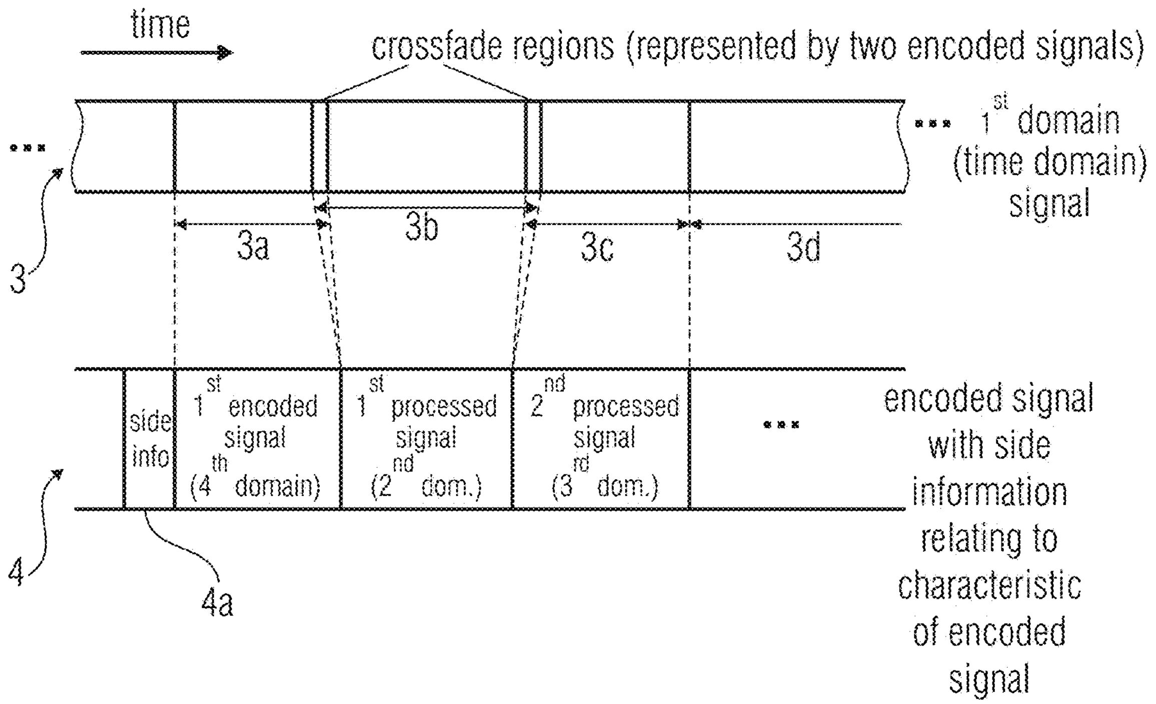
FIG. 3*e* illustrates an illustration of a time domain signal and a corresponding representation of the encoded signal illustrating short cross fade regions which are included in both encoded signals.

This situation is illustrated, from an encoder perspective, in FIG. 3*e*. The upper portion in FIG. 3*e* illustrates in the schematic representation, a first domain audio signal such as a time domain audio signal, where the time index increases from left to right and item 3 might be considered as a stream of audio samples representing the signal 195 in FIG. 3*c*. FIG. 3*e* illustrates frames 3*a*, 3*b*, 3*c*, 3*d* which may be generated by switching between the first encoded signal and the first processed signal and the second processed signal as illustrated at item 4 in FIG. 3*e*. The first encoded signal, the first processed signal and the second processed signals are all in different domains and in order to make sure that the switch between the different domains does not result in an artifact on the decoder-side, frames 3*a*, 3*b* of the time domain signal have an overlapping range which is indicated as a cross fade region, and such a cross fade region is there at frame 3*b* and 3*c*. However, no such cross fade region is existing between frame 3*d*, 3*c* which means that frame 3*d* is also represented by a second processed signal, i.e., a signal in the third domain, and there is no domain change between frame 3*c* and 3*d*. Therefore, generally, it is advantageous not to provide a cross fade region where there is no domain change and to provide a cross fade region, i.e., a portion of the audio signal which is encoded by two subsequent coded/processed signals when there is a domain change, i.e., a switching action of either of the two switches. Crossfades are performed for other domain changes.

In the embodiment, in which the first encoded signal or the second processed signal has been generated by an MDCT processing having e.g. 50 percents overlap, each time domain sample is included in two subsequent frames. Due to the characteristics of the MDCT, however, this does not result in an overhead, since the MDCT is a critically sampled system. In this context, critically sampled means that the number of spectral values is the same as the number of time domain values. The MDCT is advantageous in that the crossover effect is provided without a specific crossover region so that a crossover from an MDCT block to the next MDCT block is provided without any overhead which would violate the critical sampling requirement.

The first coding algorithm in the first coding branch is based on an information sink model, and the second coding algorithm in the second coding branch is based on an information source or an SNR model. An SNR model is a model which is not specifically related to a specific sound generation mechanism but which is one coding mode which can be selected among a plurality of coding modes based e.g. on a closed loop decision. Thus, an SNR model is any available coding model but which does not necessarily have to be related to the physical constitution of the sound generator but which is any parameterized coding model different from the information sink model, which can be selected by a closed loop decision and, specifically, by comparing different SNR results from different models.

As illustrated in FIG. 3*c*, a controller 300, 525 is provided. This controller may include the functionalities of the decision stage 300 of FIG. 1*a* and, additionally, may include the functionality of the switch control device 525 in FIG. 1*a*. Generally, the controller is for controlling the first switch and the second switch in a signal adaptive way. The controller is operative to analyze a signal input into the first switch or output by the first or the second coding branch or signals obtained by encoding and decoding from the first and the second encoding branch with respect to a target function. Alternatively, or additionally, the controller is operative to analyze the signal input into the second switch or output by the first processing branch or the second processing branch or obtained by processing and inverse processing from the first processing branch and the second processing branch, again with respect to a target function.

In one embodiment, the first coding branch or the second coding branch comprises an aliasing introducing time/frequency conversion algorithm such as an MDCT or an MDST algorithm, which is different from a straightforward FFT transform, which does not introduce an aliasing effect. Furthermore, one or both branches comprise a quantizer/entropy coder block. Specifically, only the second processing branch of the second coding branch includes the time/frequency converter introducing an aliasing operation and the first processing branch of the second coding branch comprises a quantizer and/or entropy coder and does not introduce any aliasing effects. The aliasing introducing time/frequency converter comprises a windower for applying an analysis window and an MDCT transform algorithm. Specifically, the windower is operative to apply the window function to subsequent frames in an overlapping way so that a sample of a windowed signal occurs in at least two subsequent windowed frames.

In one embodiment, the first processing branch comprises an ACELP coder and a second processing branch comprises an MDCT spectral converter and the quantizer for quantizing spectral components to obtain quantized spectral components, where each quantized spectral component is zero or is defined by one quantizer index of the plurality of different possible quantizer indices.

Furthermore, it is advantageous that the first switch 200 operates in an open loop manner and the second switch operates in a closed loop manner.

As stated before, both coding branches are operative to encode the audio signal in a block wise manner, in which the first switch or the second switch switches in a block-wise manner so that a switching action takes place, at the minimum, after a block of a predefined number of samples of a signal, the predefined number forming a frame length for the corresponding switch. Thus, the granule for switching by the first switch may be, for example, a block of 2048 or 1028 samples, and the frame length, based on which the first switch 200 is switching may be variable but is fixed to such a quite long period.

Contrary thereto, the block length for the second switch 521, i.e., when the second switch 521 switches from one mode to the other, is substantially smaller than the block length for the first switch. Both block lengths for the switches are selected such that the longer block length is an integer multiple of the shorter block length. In the embodiment, the block length of the first switch is 2048 or 1024 and the block length of the second switch is 1024 or more advantageous, 512 and even more advantageous, 256 and even more advantageous 128 samples so that, at the maximum, the second switch can switch 16 times when the first switch switches only a single time. A maximum block length ratio, however, is 4:1.

In a further embodiment, the controller 300, 525 is operative to perform a speech music discrimination for the first switch in such a way that a decision to speech is favored with respect to a decision to music. In this embodiment, a decision to speech is taken even when a portion less than 50% of a frame for the first switch is speech and the portion of more than 50% of the frame is music.

Furthermore, the controller is operative to already switch to the speech mode, when a quite small portion of the first frame is speech and, specifically, when a portion of the first frame is speech, which is 50% of the length of the smaller second frame. Thus, a speech/favouring switching decision already switches over to speech even when, for example, only 6% or 12% of a block corresponding to the frame length of the first switch is speech.

This procedure is in order to fully exploit the bit rate saving capability of the first processing branch, which has a voiced speech core in one embodiment and to not lose any quality even for the rest of the large first frame, which is non-speech due to the fact that the second processing branch includes a converter and, therefore, is useful for audio signals which have non-speech signals as well. This second processing branch includes an overlapping MDCT, which is critically sampled, and which even at small window sizes provides a highly efficient and aliasing free operation due to the time domain aliasing cancellation processing such as overlap and add on the decoder-side. Furthermore, a large block length for the first encoding branch which is an AAC-like MDCT encoding branch is useful, since non-speech signals are normally quite stationary and a long transform window provides a high frequency resolution and, therefore, high quality and, additionally, provides a bit rate efficiency due to a psycho acoustically controlled quantization module, which can also be applied to the transform based coding mode in the second processing branch of the second coding branch.

Regarding the FIG. 3*d* decoder illustration, it is advantageous that the transmitted signal includes an explicit indicator as side information 4*a* as illustrated in FIG. 3*e*. This side information 4*a* is extracted by a bit stream parser not illustrated in FIG. 3*d* in order to forward the corresponding first encoded signal, first processed signal or second processed signal to the correct processor such as the first decoding branch, the first inverse processing branch or the second inverse processing branch in FIG. 3*d*. Therefore, an encoded signal not only has the encoded/processed signals but also includes side information relating to these signals. In other embodiments, however, there can be an implicit signaling which allows a decoder-side bit stream parser to distinguish between the certain signals. Regarding FIG. 3*e*, it is outlined that the first processed signal or the second processed signal is the output of the second coding branch and, therefore, the second coded signal.

The first decoding branch and/or the second inverse processing branch includes an MDCT transform for converting from the spectral domain to the time domain. To this end, an overlap-adder is provided to perform a time domain aliasing cancellation functionality which, at the same time, provides a cross fade effect in order to avoid blocking artifacts. Generally, the first decoding branch converts a signal encoded in the fourth domain into the first domain, while the second inverse processing branch performs a conversion from the third domain to the second domain and the converter subsequently connected to the first combiner provides a conversion from the second domain to the first domain so that, at the input of the combiner 600, only first domain signals are there, which represent, in the FIG. 3*d* embodiment, the decoded output signal.

FIGS. 4*a* and 4*b* illustrate two different embodiments, which differ in the positioning of the switch 200. In FIG. 4*a*, the switch 200 is positioned between an output of the common pre-processing stage 100 and input of the two encoded branches 400, 500. The FIG. 4*a* embodiment makes sure that the audio signal is input into a single encoding branch only, and the other encoding branch, which is not connected to the output of the common pre-processing stage does not operate and, therefore, is switched off or is in a sleep mode. This embodiment is in that the non-active encoding branch does not consume power and computational resources which is useful for mobile applications in particular, which are battery-powered and, therefore, have the general limitation of power consumption.

On the other hand, however, the FIG. 4*b* embodiment may be advantageous when power consumption is not an issue. In this embodiment, both encoding branches 400, 500 are active all the time, and only the output of the selected encoding branch for a certain time portion and/or a certain frequency portion is forwarded to the bit stream formatter which may be implemented as a bit stream multiplexer 800. Therefore, in the FIG. 4*b* embodiment, both encoding branches are active all the time, and the output of an encoding branch which is selected by the decision stage 300 is entered into the output bit stream, while the output of the other non-selected encoding branch 400 is discarded, i.e., not entered into the output bit stream, i.e., the encoded audio signal.

Figure 4C:
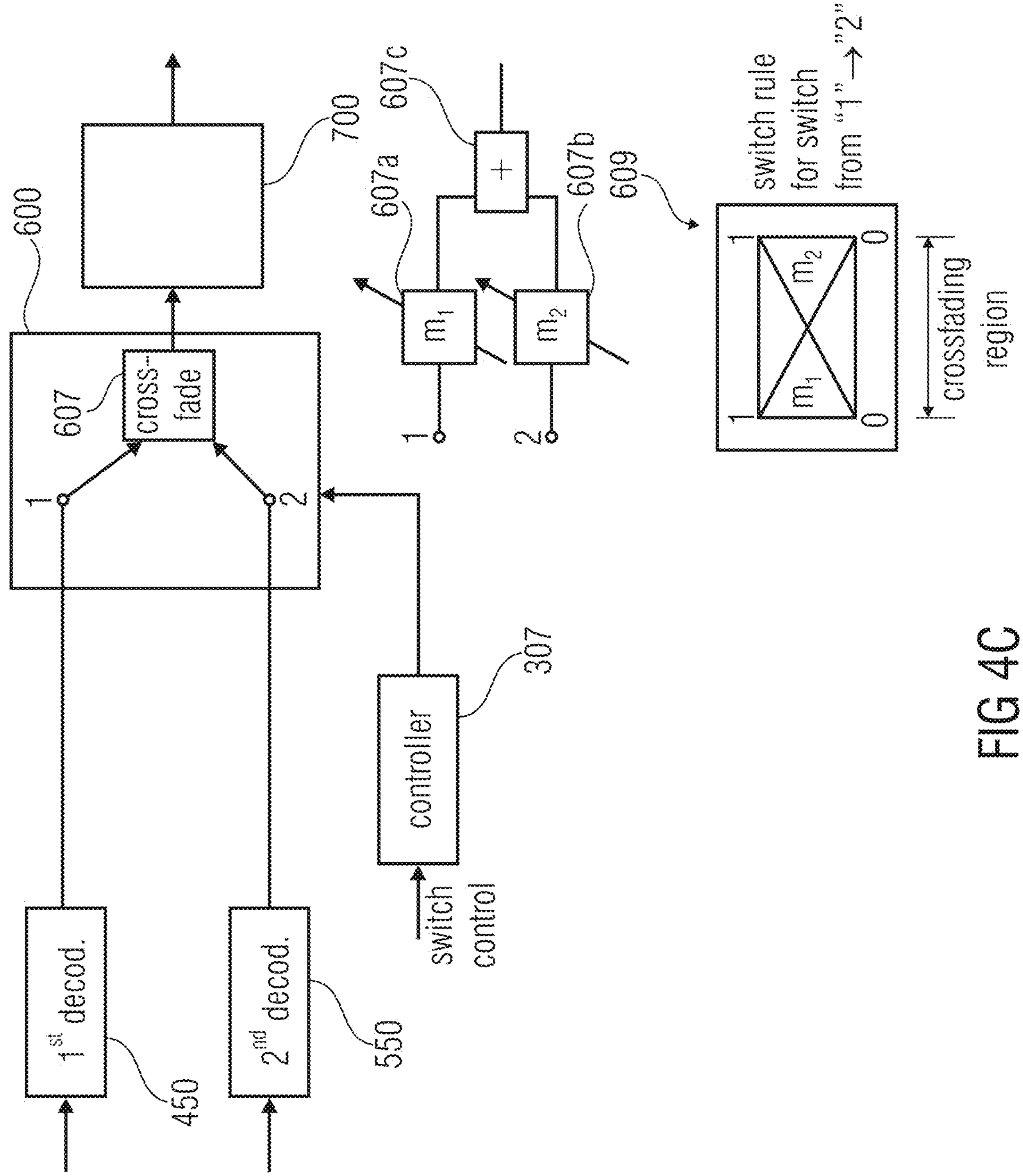
FIG. 4*c* illustrates a block diagram for a combiner embodiment.

FIG. 4*c* illustrates a further aspect of a decoder implementation. In order to avoid audible artifacts specifically in the situation, in which the first decoder is a time-aliasing generating decoder or generally stated a frequency domain decoder and the second decoder is a time domain device, the borders between blocks or frames output by the first decoder 450 and the second decoder 550 should not be fully continuous, specifically in a switching situation. Thus, when the first block of the first decoder 450 is output and, when for the subsequent time portion, a block of the second decoder is output, it is advantageous to perform a cross fading operation as illustrated by cross fade block 607. To this end, the cross fade block 607 might be implemented as illustrated in FIGS. 4*c* at 607*a*, 607*b* and 607*c*. Each branch might have a weighter having a weighting factor $m_1$ between 0 and 1 on the normalized scale, where the weighting factor can vary as indicated in the plot 609, such a cross fading rule makes sure that a continuous and smooth cross fading takes place which, additionally, assures that a user will not perceive any loudness variations. Non-linear crossfade rules such as a $\sin^2$ crossfade rule can be applied instead of a linear crossfade rule.

In certain instances, the last block of the first decoder was generated using a window where the window actually performed a fade out of this block. In this case, the weighting factor $m_1$ in block 607*a* is equal to 1 and, actually, no weighting at all is needed for this branch.

When a switch from the second decoder to the first decoder takes place, and when the second decoder includes a window which actually fades out the output to the end of the block, then the weighter indicated with "$m_2$" would not be needed or the weighting parameter can be set to 1 throughout the whole cross fading region.

When the first block after a switch was generated using a windowing operation, and when this window actually performed a fade in operation, then the corresponding weighting factor can also be set to 1 so that a weighter is not really necessary. Therefore, when the last block is windowed in order to fade out by the decoder and when the first block after the switch is windowed using the decoder in order to provide a fade in, then the weighters 607*a*, 607*b* are not needed at all and an addition operation by adder 607*c* is sufficient.

In this case, the fade out portion of the last frame and the fade in portion of the next frame define the cross fading region indicated in block 609. Furthermore, it is advantageous in such a situation that the last block of one decoder has a certain time overlap with the first block of the other decoder.

If a cross fading operation is not needed or not possible or not desired, and if only a hard switch from one decoder to the other decoder is there, it is advantageous to perform such a switch in silent passages of the audio signal or at least in passages of the audio signal where there is low energy, i.e., which are perceived to be silent or almost silent. The decision stage 300 assures in such an embodiment that the switch 200 is only activated when the corresponding time portion which follows the switch event has an energy which is, for example, lower than the mean energy of the audio signal and is lower than 50% of the mean energy of the audio signal related to, for example, two or even more time portions/frames of the audio signal.

The second encoding rule/decoding rule is an LPC-based coding algorithm. In LPC-based speech coding, a differentiation between quasi-periodic impulse-like excitation signal segments or signal portions, and noise-like excitation signal segments or signal portions, is made. This is performed for very low bit rate LPC vocoders (2.4 kbps) as in FIG. 7*b*. However, in medium rate CELP coders, the excitation is obtained for the addition of scaled vectors from an adaptive codebook and a fixed codebook.

Quasi-periodic impulse-like excitation signal segments, i.e., signal segments having a specific pitch are coded with different mechanisms than noise-like excitation signals. While quasi-periodic impulse-like excitation signals are connected to voiced speech, noise-like signals are related to unvoiced speech.

Figures 5A, 5B:
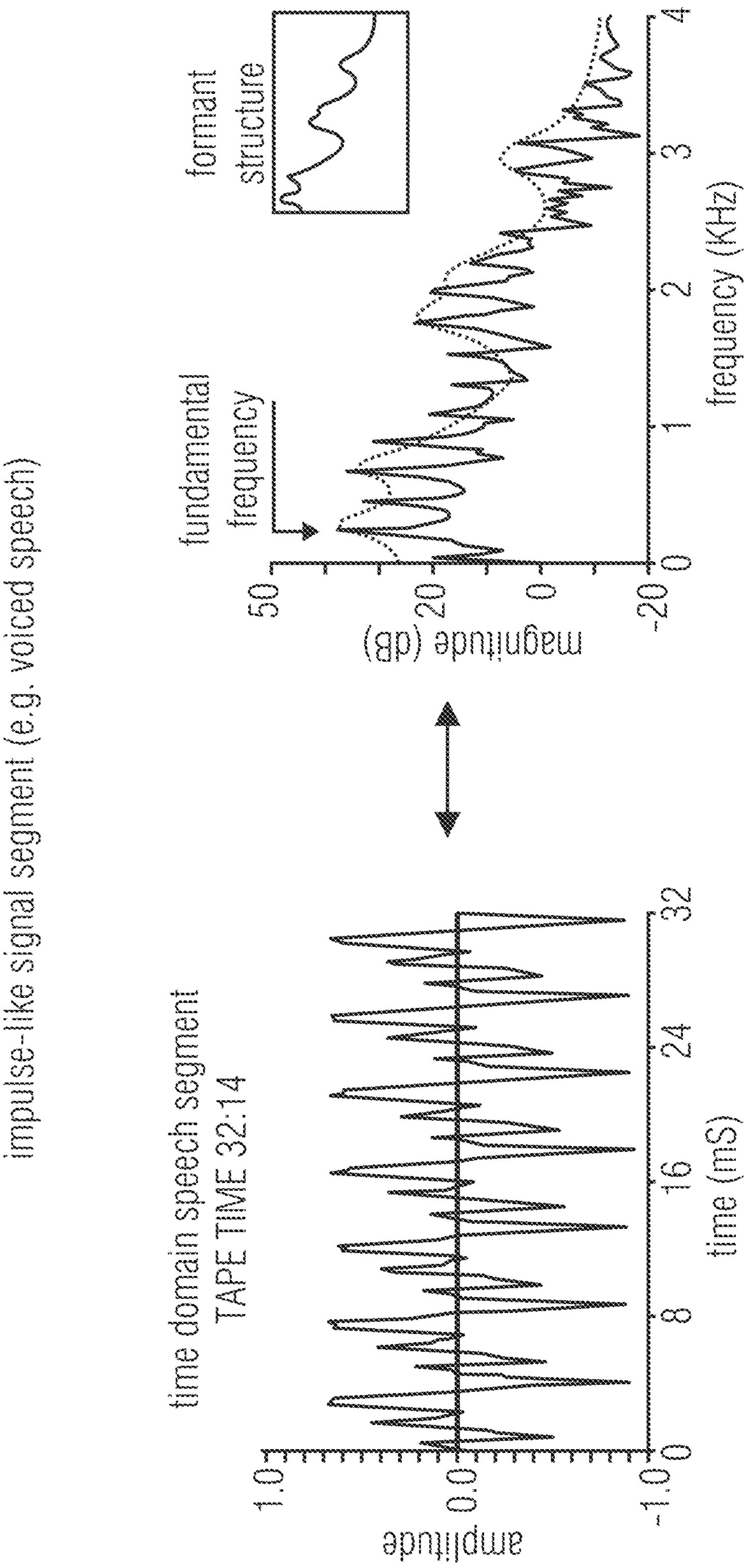
FIG. 5*a* illustrates a wave form of a time domain speech segment as a quasi-periodic or impulse-like signal segment.
FIG. 5*b* illustrates a spectrum of the segment of FIG. 5*a;*

Exemplarily, reference is made to FIGS. 5*a* to 5*d*. Here, quasi-periodic impulse-like signal segments or signal portions and noise-like signal segments or signal portions are exemplarily discussed. Specifically, a voiced speech as illustrated in FIG. 5*a* in the time domain and in FIG. 5*b* in the frequency domain is discussed as an example for a quasi-periodic impulse-like signal portion, and an unvoiced speech segment as an example for a noise-like signal portion is discussed in connection with FIGS. 5*c* and 5*d*. Speech can generally be classified as voiced, unvoiced, or mixed. Time-and-frequency domain plots for sampled voiced and unvoiced segments are shown in FIGS. 5*a* to 5*d*. Voiced speech is quasi periodic in the time domain and harmonically structured in the frequency domain, while unvoiced speed is random-like and broadband. The short-time spectrum of voiced speech is characterized by its fine harmonic formant structure. The fine harmonic structure is a consequence of the quasi-periodicity of speech and may be attributed to the vibrating vocal chords. The formant structure (spectral envelope) is due to the interaction of the source and the vocal tracts. The vocal tracts consist of the pharynx and the mouth cavity. The shape of the spectral envelope that "fits" the short time spectrum of voiced speech is associated with the transfer characteristics of the vocal tract and the spectral tilt (6 db/Octave) due to the glottal pulse. The spectral envelope is characterized by a set of peaks which are called formants. The formants are the resonant modes of the vocal tract. For the average vocal tract there are three to five formants below 5 kHz. The amplitudes and locations of the first three formants, usually occurring below 3 kHz are quite important both, in speech synthesis and perception. Higher formants are also important for wide band and unvoiced speech representations. The properties of speech are related to the physical speech production system as follows. Voiced speech is produced by exciting the vocal tract with quasi-periodic glottal air pulses generated by the vibrating vocal chords. The frequency of the periodic pulses is referred to as the fundamental frequency or pitch. Unvoiced speech is produced by forcing air through a constriction in the vocal tract. Nasal sounds are due to the acoustic coupling of the nasal tract to the vocal tract, and plosive sounds are produced by abruptly releasing the air pressure which was built up behind the closure in the tract.

Figures 5C, 5D:
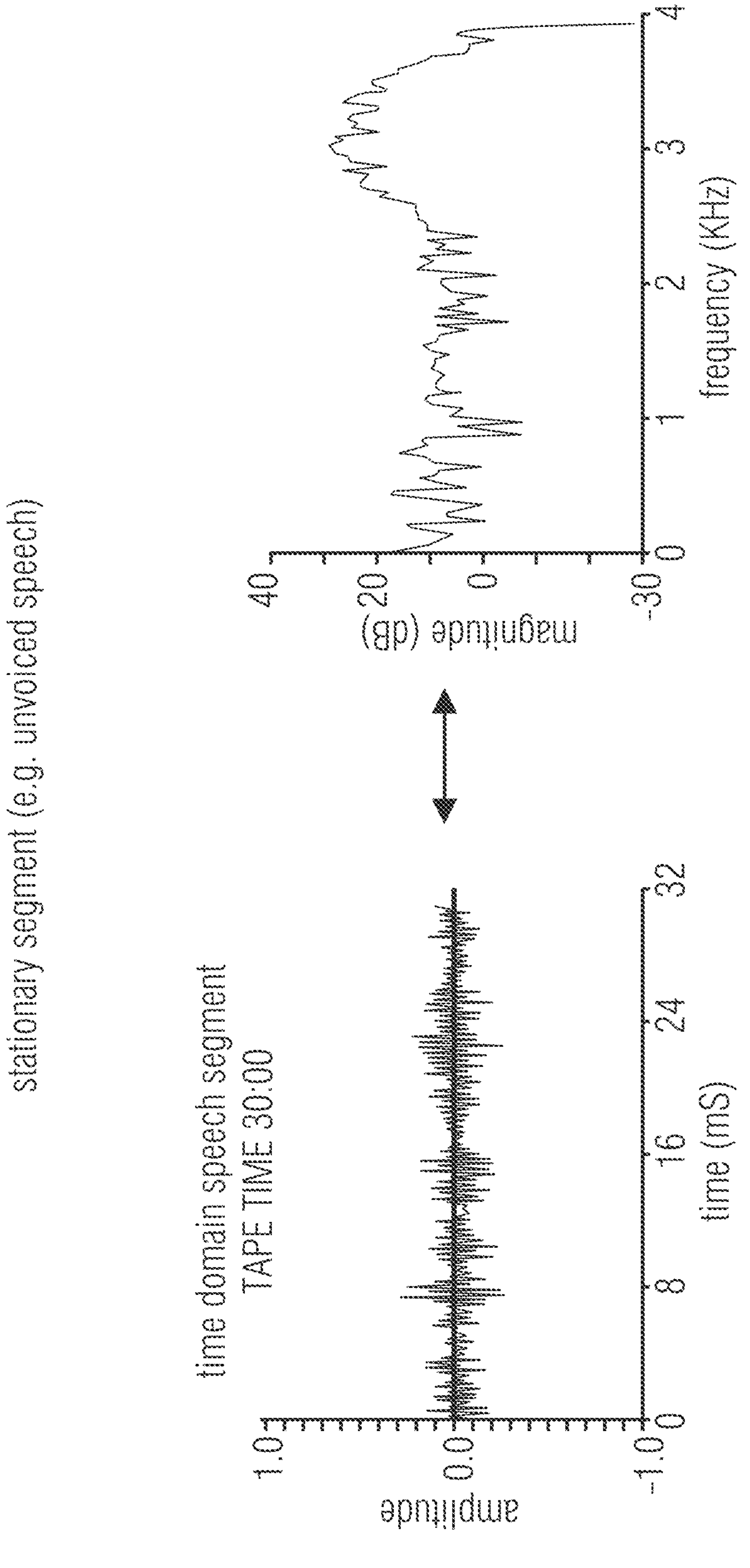
FIG. 5*c* illustrates a time domain speech segment of unvoiced speech as an example for a noise-like segment.
FIG. 5*d* illustrates a spectrum of the time domain wave form of FIG. 5*c;*

Thus, a noise-like portion of the audio signal shows neither any impulse-like time-domain structure nor harmonic frequency-domain structure as illustrated in FIG. 5*c* and in FIG. 5*d*, which is different from the quasi-periodic impulse-like portion as illustrated for example in FIG. 5*a* and in FIG. 5*b*. As will be outlined later on, however, the differentiation between noise-like portions and quasi-periodic impulse-like portions can also be observed after a LPC for the excitation signal. The LPC is a method which models the vocal tract and extracts from the signal the excitation of the vocal tracts.

Furthermore, quasi-periodic impulse-like portions and noise-like portions can occur in a timely manner, i.e., which means that a portion of the audio signal in time is noisy and another portion of the audio signal in time is quasi-periodic, i.e. tonal. Alternatively, or additionally, the characteristic of a signal can be different in different frequency bands. Thus, the determination, whether the audio signal is noisy or tonal, can also be performed frequency-selective so that a certain frequency band or several certain frequency bands are considered to be noisy and other frequency bands are considered to be tonal. In this case, a certain time portion of the audio signal might include tonal components and noisy components.

FIG. 7*a* illustrates a linear model of a speech production system. This system assumes a two-stage excitation, i.e., an impulse-train for voiced speech as indicated in FIG. 7*c*, and a random-noise for unvoiced speech as indicated in FIG. 7*d*. The vocal tract is modelled as an all-pole filter 70 which processes pulses of FIG. 7*c* or FIG. 7*d*, generated by the glottal model 72. Hence, the system of FIG. 7*a* can be reduced to an all pole-filter model of FIG. 7*b* having a gain stage 77, a forward path 78, a feedback path 79, and an adding stage 80. In the feedback path 79, there is a prediction filter 81, and the whole source-model synthesis system illustrated in FIG. 7*b* can be represented using z-domain functions as follows:

$$S(z)=g/(1-A(z))\cdot X(z),$$

where g represents the gain, A(z) is the prediction filter as determined by an LP analysis, X(z) is the excitation signal, and S(z) is the synthesis speech output.

FIGS. 7*c* and 7*d* give a graphical time domain description of voiced and unvoiced speech synthesis using the linear source system model. This system and the excitation parameters in the above equation are unknown and may be determined from a finite set of speech samples. The coefficients of A(z) are obtained using a linear prediction of the input signal and a quantization of the filter coefficients. In a p-th order forward linear predictor, the present sample of the speech sequence is predicted from a linear combination of p past samples. The predictor coefficients can be determined by well-known algorithms such as the Levinson-Durbin algorithm, or generally an autocorrelation method or a reflection method.

FIG. 7*e* illustrates a more detailed implementation of the LPC analysis block 510. The audio signal is input into a filter determination block which determines the filter information A(z). This information is output as the short-term prediction information needed for a decoder. The short-term prediction information is needed by the actual prediction filter 85. In a subtracter 86, a current sample of the audio signal is input and a predicted value for the current sample is subtracted so that for this sample, the prediction error signal is generated at line 84. A sequence of such prediction error signal samples is very schematically illustrated in FIG. 7*c* or 7*d*. Therefore, FIG. 7*c*, 7*d* can be considered as a kind of a rectified impulse-like signal.

While FIG. 7*e* illustrates a way to calculate the excitation signal, FIG. 7*f* illustrates a way to calculate the weighted signal. In contrast to FIG. 7*e*, the filter 85 is different, when $\gamma$ is different from 1. A value smaller than 1 is advantageous for $\gamma$. Furthermore, the block 87 is present, and $\mu$ is a number smaller than 1. Generally, the elements in FIGS. 7*e* and 7*f* can be implemented as in 3GPP TS 26.190 or 3GPP TS 26.290.

Figure 7G:
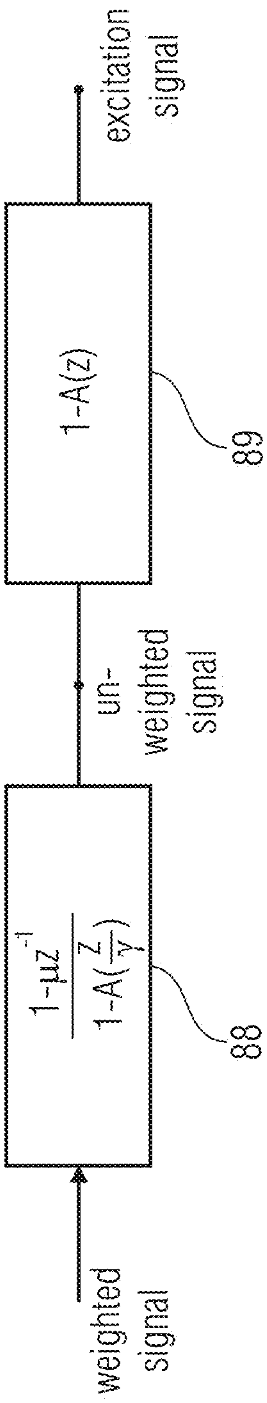
FIG. 7*g* illustrates an implementation for transforming a weighted signal into an excitation signal by applying an inverse weighting operation and a subsequent excitation analysis as needed in the converter 537 of FIG. 2*b;*

FIG. 7*g* illustrates an inverse processing, which can be applied on the decoder side such as in element 537 of FIG.

2*b*. Particularly, block 88 generates an unweighted signal from the weighted signal and block 89 calculates an excitation from the unweighted signal. Generally, all signals but the unweighted signal in FIG. 7*g* are in the LPC domain, but the excitation signal and the weighted signal are different signals in the same domain. Block 89 outputs an excitation signal which can then be used together with the output of block 536. Then, the common inverse LPC transform can be performed in block 540 of FIG. 2*b*.

Figure 6:
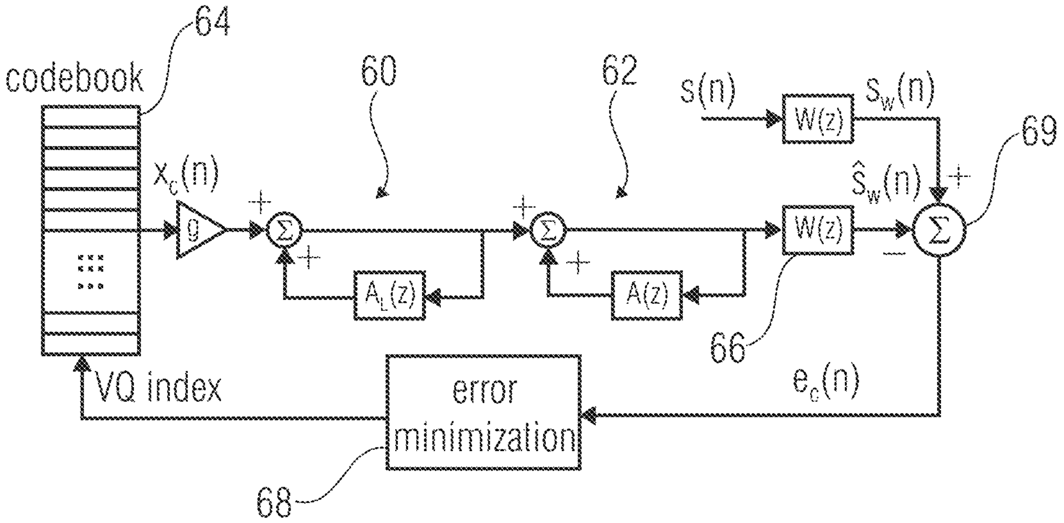
FIG. 6 illustrates a block diagram of an analysis by synthesis CELP encoder.

Subsequently, an analysis-by-synthesis CELP encoder will be discussed in connection with FIG. 6 in order to illustrate the modifications applied to this algorithm. This CELP encoder is discussed in detail in "Speech Coding: A Tutorial Review", Andreas Spanias, Proceedings of the IEEE, Vol. 82, No. 10, October 1994, pages 1541-1582. The CELP encoder as illustrated in FIG. 6 includes a long-term prediction component 60 and a short-term prediction component 62. Furthermore, a codebook is used which is indicated at 64. A perceptual weighting filter W(z) is implemented at 66, and an error minimization controller is provided at 68. s(n) is the time-domain input signal. After having been perceptually weighted, the weighted signal is input into a subtracter 69, which calculates the error between the weighted synthesis signal at the output of block 66 and the original weighted signal $S_w(n)$. Generally, the short-term prediction filter coefficients A(z) are calculated by an LP analysis stage and its coefficients are quantized in $\hat{A}(z)$ as indicated in FIG. 7*e*. The long-term prediction information $A_L(z)$ including the long-term prediction gain g and the vector quantization index, i.e., codebook references are calculated on the prediction error signal at the output of the LPC analysis stage referred as 10*a* in FIG. 7*e*. The LTP parameters are the pitch delay and gain. In CELP this is usually implemented as an adaptive codebook containing the past excitation signal (not the residual). The adaptive CB delay and gain are found by minimizing the mean-squared weighted error (closed-loop pitch search).

The CELP algorithm encodes then the residual signal obtained after the short-term and long-term predictions using a codebook of for example Gaussian sequences. The ACELP algorithm, where the "A" stands for "Algebraic" has a specific algebraically designed codebook.

A codebook may contain more or less vectors where each vector is some samples long. A gain factor g scales the code vector and the gained code is filtered by the long-term prediction synthesis filter and the short-term prediction synthesis filter. The "optimum" code vector is selected such that the perceptually weighted mean square error at the output of the subtracter 69 is minimized. The search process in CELP is done by an analysis-by-synthesis optimization as illustrated in FIG. 6.

For specific cases, when a frame is a mixture of unvoiced and voiced speech or when speech over music occurs, a TCX coding can be more appropriate to code the excitation in the LPC domain. The TCX coding processes a weighted signal in the frequency domain without doing any assumption of excitation production. The TCX is then more generic than CELP coding and is not restricted to a voiced or a non-voiced source model of the excitation. TCX is still a source-filter model coding using a linear predictive filter for modelling the formants of the speech-like signals.

In the AMR-WB+-like coding, a selection between different TCX modes and ACELP takes place as known from the AMR-WB+ description. The TCX modes are different in that the length of the block-wise Discrete Fourier Transform is different for different modes and the best mode can be selected by an analysis by synthesis approach or by a direct "feedforward" mode.

As discussed in connection with FIGS. 2*a* and 2*b*, the common pre-processing stage 100 includes a joint multichannel (surround/joint stereo device) 101 and, additionally, a band width extension stage 102. Correspondingly, the decoder includes a band width extension stage 701 and a subsequently connected joint multichannel stage 702. The joint multichannel stage 101 is, with respect to the encoder, connected before the band width extension stage 102, and, on the decoder side, the band width extension stage 701 is connected before the joint multichannel stage 702 with respect to the signal processing direction. Alternatively, however, the common pre-processing stage can include a joint multichannel stage without the subsequently connected bandwidth extension stage or a bandwidth extension stage without a connected joint multichannel stage.

Figure 8:
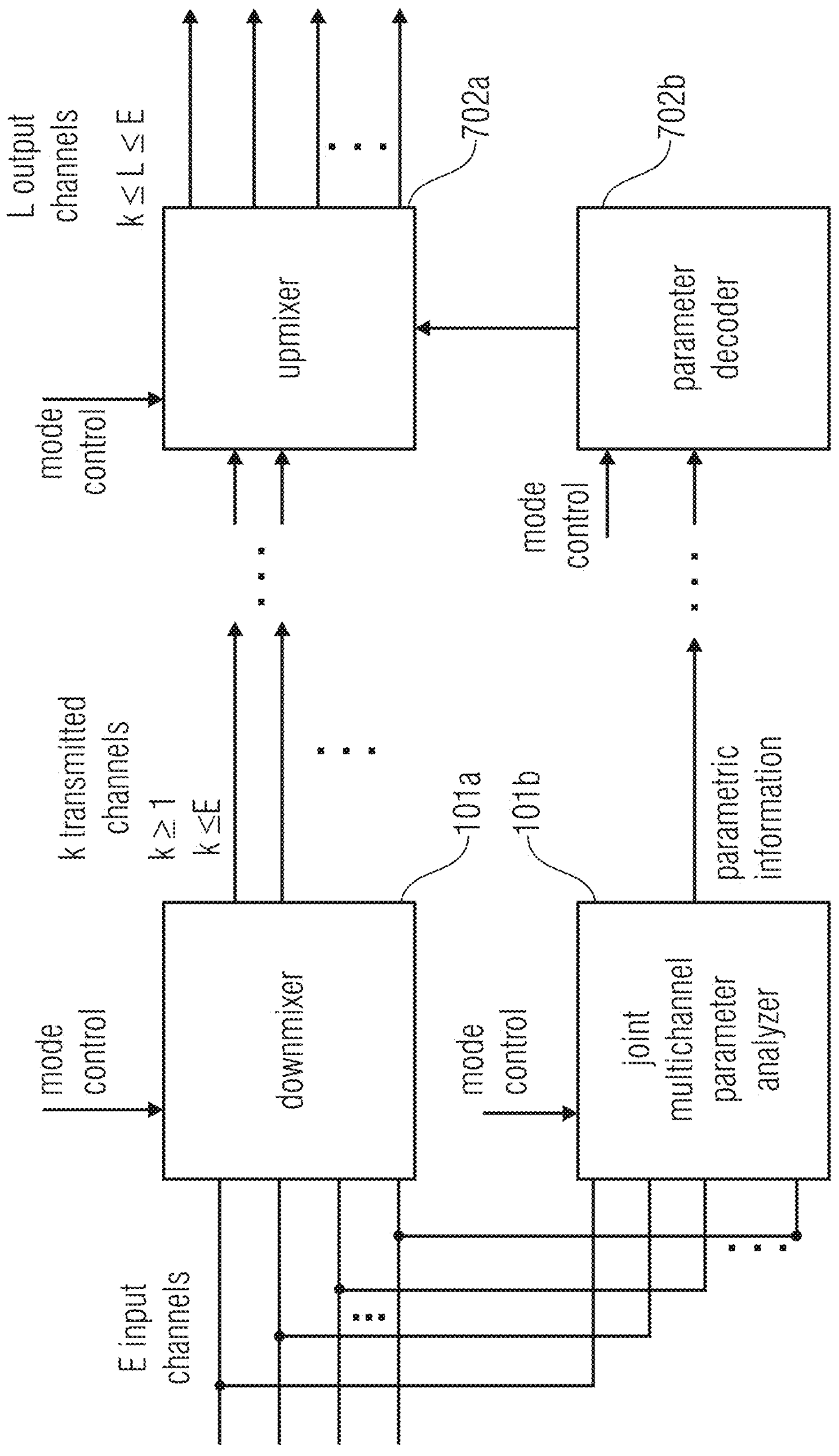
FIG. 8 illustrates a block diagram of a joint multi-channel algorithm in accordance with an embodiment of the present invention.

An example for a joint multichannel stage on the encoder side 101*a*, 101*b* and on the decoder side 702*a* and 702*b* is illustrated in the context of FIG. 8. A number of E original input channels is input into the downmixer 101*a* so that the downmixer generates a number of K transmitted channels, where the number K is greater than or equal to one and is smaller than or equal E.

The E input channels are input into a joint multichannel parameter analyzer 101*b* which generates parametric information. This parametric information is entropy-encoded such as by a difference encoding and subsequent Huffman encoding or, alternatively, subsequent arithmetic encoding. The encoded parametric information output by block 101*b* is transmitted to a parameter decoder 702*b* which may be part of item 702 in FIG. 2*b*. The parameter decoder 702*b* decodes the transmitted parametric information and forwards the decoded parametric information into the upmixer 702*a*. The upmixer 702*a* receives the K transmitted channels and generates a number of L output channels, where the number of L is greater than or equal K and lower than or equal to E.

Parametric information may include inter channel level differences, inter channel time differences, inter channel phase differences and/or inter channel coherence measures as is known from the BCC technique or as is known and is described in detail in the MPEG surround standard. The number of transmitted channels may be a single mono channel for ultra-low bit rate applications or may include a compatible stereo application or may include a compatible stereo signal, i.e., two channels. Typically, the number of E input channels may be five or maybe even higher. Alternatively, the number of E input channels may also be E audio objects as it is known in the context of spatial audio object coding (SAOC).

In one implementation, the downmixer performs a weighted or unweighted addition of the original E input channels or an addition of the E input audio objects. In case of audio objects as input channels, the joint multichannel parameter analyzer 101*b* will calculate audio object parameters such as a correlation matrix between the audio objects for each time portion and even more advantageously for each frequency band. To this end, the whole frequency range may be divided in at least 10 and advantageously 32 or 64 frequency bands.

Figure 9:
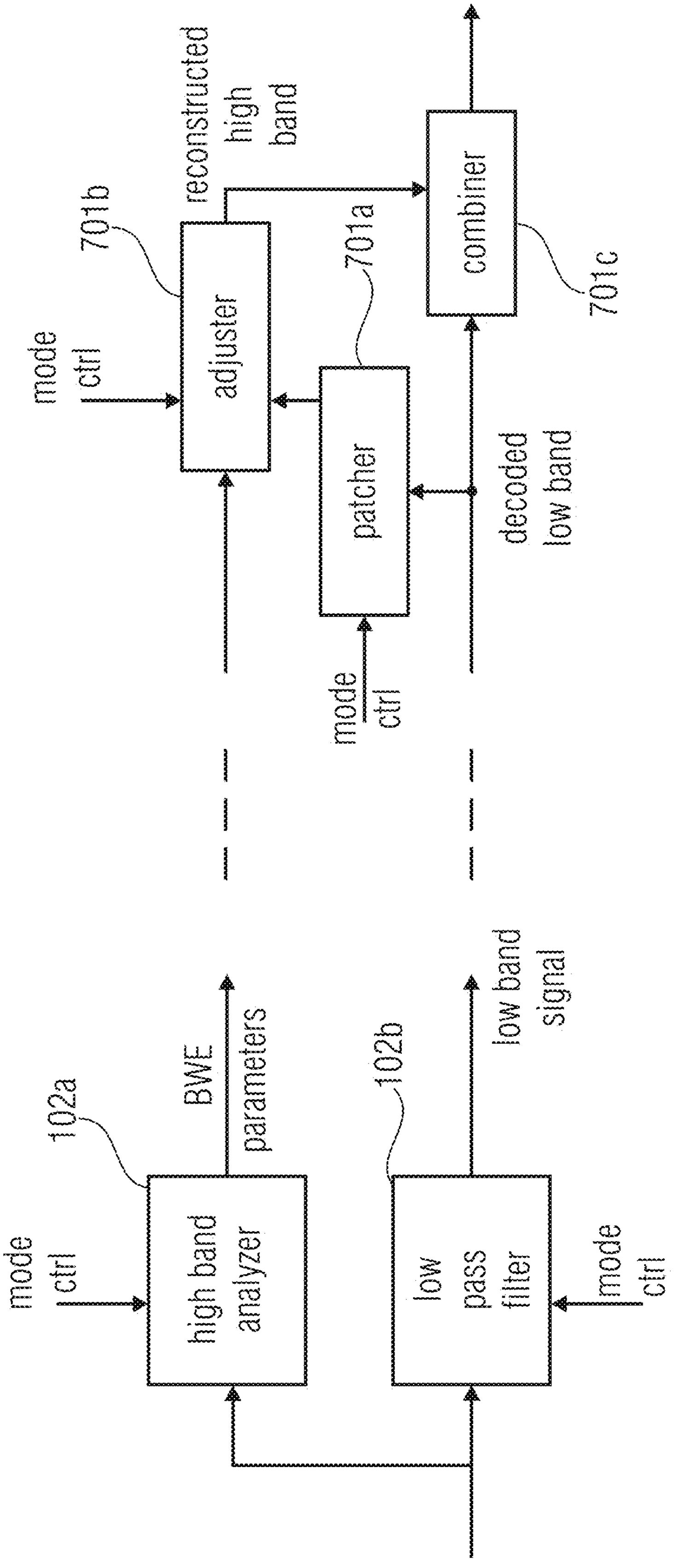
FIG. 9 illustrates an embodiment of a bandwidth extension algorithm.

FIG. 9 illustrates an embodiment for the implementation of the bandwidth extension stage 102 in FIG. 2*a* and the corresponding band width extension stage 701 in FIG. 2*b*. On the encoder-side, the bandwidth extension block 102 includes a low pass filtering block 102*b*, a downsampler block, which follows the lowpass, or which is part of the inverse QMF, which acts on only half of the QMF bands, and a high band analyzer 102*a*. The original audio signal input into the bandwidth extension block 102 is lowpass filtered to generate the low band signal which is then input into the encoding branches and/or the switch. The low pass filter has a cut off frequency which can be in a range of 3 kHz to 10 kHz. Furthermore, the bandwidth extension block 102 furthermore includes a high band analyzer for calculating the bandwidth extension parameters such as a spectral envelope parameter information, a noise floor parameter information, an inverse filtering parameter information, further parametric information relating to certain harmonic lines in the high band and additional parameters as discussed in detail in the MPEG-4 standard in the chapter related to spectral band replication.

On the decoder-side, the bandwidth extension block 701 includes a patcher 701*a*, an adjuster 701*b* and a combiner 701*c*. The combiner 701*c* combines the decoded low band signal and the reconstructed and adjusted high band signal output by the adjuster 701*b*. The input into the adjuster 701*b* is provided by a patcher which is operated to derive the high band signal from the low band signal such as by spectral band replication or, generally, by bandwidth extension. The patching performed by the patcher 701*a* may be a patching performed in a harmonic way or in a non-harmonic way. The signal generated by the patcher 701*a* is, subsequently, adjusted by the adjuster 701*b* using the transmitted parametric bandwidth extension information.

As indicated in FIG. 8 and FIG. 9, the described blocks may have a mode control input in an embodiment. This mode control input is derived from the decision stage 300 output signal. In such an embodiment, a characteristic of a corresponding block may be adapted to the decision stage output, i.e., whether, in an embodiment, a decision to speech or a decision to music is made for a certain time portion of the audio signal. The mode control only relates to one or more of the functionalities of these blocks but not to all of the functionalities of blocks. For example, the decision may influence only the patcher 701*a* but may not influence the other blocks in FIG. 9, or may, for example, influence only the joint multichannel parameter analyzer 101*b* in FIG. 8 but not the other blocks in FIG. 8. This implementation is such that a higher flexibility and higher quality and lower bit rate output signal is obtained by providing flexibility in the common pre-processing stage. On the other hand, however, the usage of algorithms in the common pre-processing stage for both kinds of signals allows to implement an efficient encoding/decoding scheme.

Figure 10A:
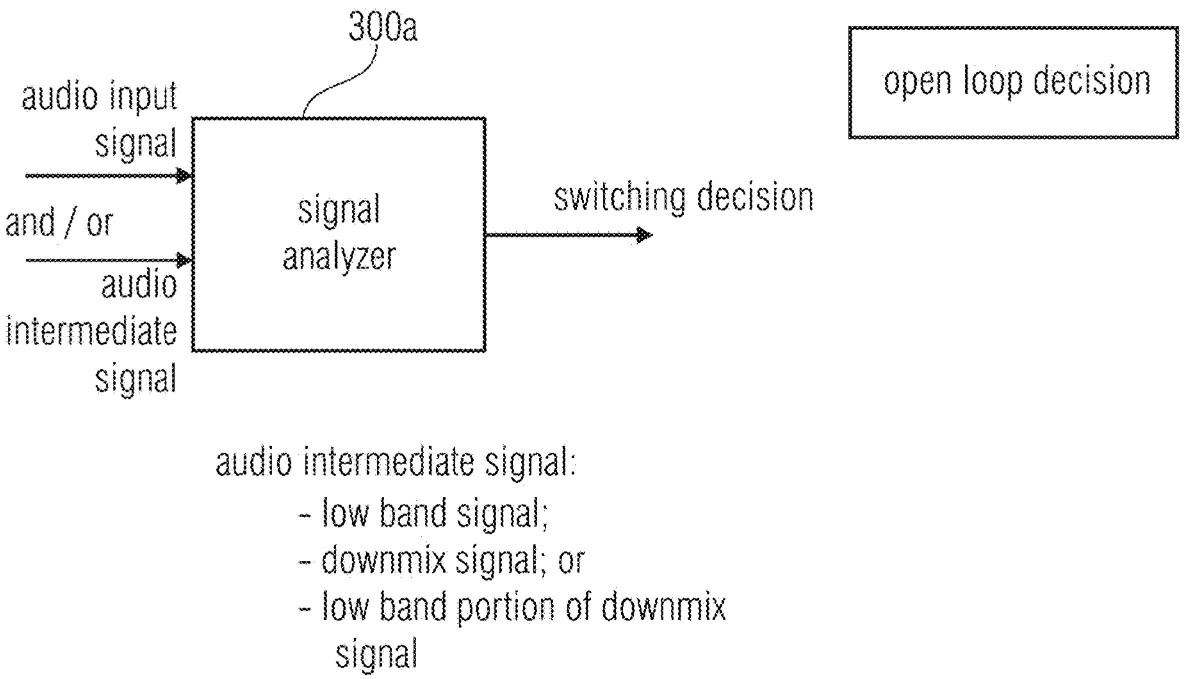
FIG. 10*a* illustrates a detailed description of the switch when performing an open loop decision.
Figure 10B:
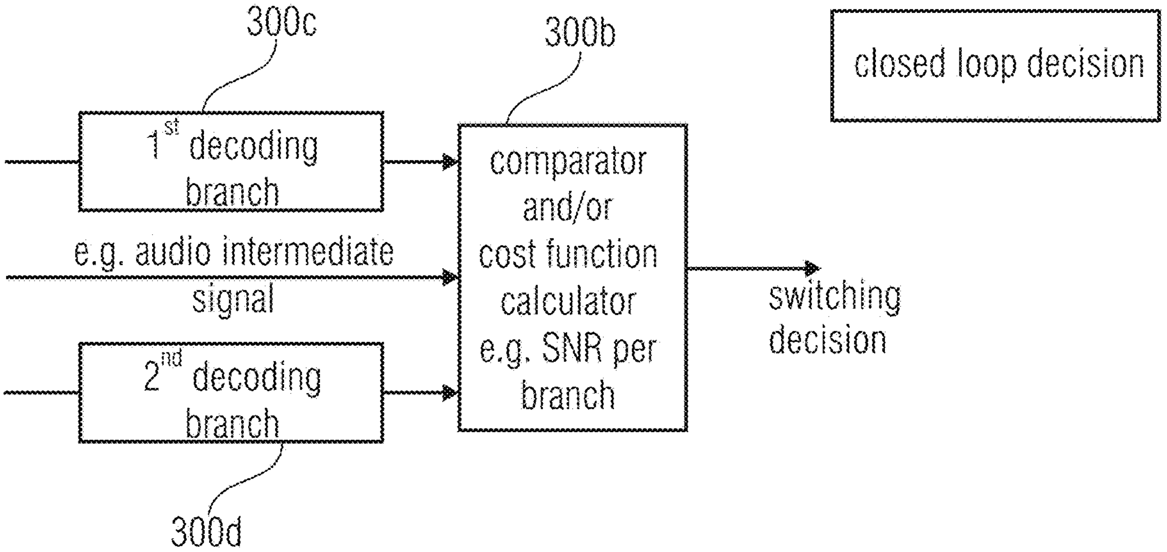
FIG. 10*b* illustrates an illustration of the switch when operating in a closed loop decision mode.

FIG. 10*a* and FIG. 10*b* illustrates two different implementations of the decision stage 300. In FIG. 10*a*, an open loop decision is indicated. Here, the signal analyzer 300*a* in the decision stage has certain rules in order to decide whether the certain time portion or a certain frequency portion of the input signal has a characteristic which necessitates that this signal portion is encoded by the first encoding branch 400 or by the second encoding branch 500. To this end, the signal analyzer 300*a* may analyze the audio input signal into the common pre-processing stage or may analyze the audio signal output by the common pre-processing stage, i.e., the audio intermediate signal or may analyze an intermediate signal within the common pre-processing stage such as the output of the downmix signal which may be a mono signal or which may be a signal having k channels indicated in FIG. 8. On the output-side, the signal analyzer 300*a* generates the switching decision for controlling the switch 200 on the encoder-side and the corresponding switch 600 or the combiner 600 on the decoder-side.

Although not discussed in detail for the second switch 521, it is to be emphasized that the second switch 521 can be positioned in a similar way as the first switch 200 as discussed in connection with FIG. 4*a* and FIG. 4*b*. Thus, an alternative position of switch 521 in FIG. 3*c* is at the output of both processing branches 522, 523, 524 so that, both processing branches operate in parallel and only the output of one processing branch is written into a bit stream via a bit stream former which is not illustrated in FIG. 3*c*.

Furthermore, the second combiner 600 may have a specific cross fading functionality as discussed in FIG. 4*c*. Alternatively or additionally, the first combiner 532 might have the same cross fading functionality. Furthermore, both combiners may have the same cross fading functionality or may have different cross fading functionalities or may have no cross fading functionalities at all so that both combiners are switches without any additional cross fading functionality.

As discussed before, both switches can be controlled via an open loop decision or a closed loop decision as discussed in connection with FIG. 10*a* and FIG. 10*b*, where the controller 300, 525 of FIG. 3*c* can have different or the same functionalities for both switches.

Furthermore, a time warping functionality which is signal-adaptive can exist not only in the first encoding branch or first decoding branch but can also exist in the second processing branch of the second coding branch on the encoder side as well as on the decoder side. Depending on a processed signal, both time warping functionalities can have the same time warping information so that the same time warp is applied to the signals in the first domain and in the second domain. This saves processing load and might be useful in some instances, in cases where subsequent blocks have a similar time warping time characteristic. In alternative embodiments, however, it is advantageous to have independent time warp estimators for the first coding branch and the second processing branch in the second coding branch.

The inventive encoded audio signal can be stored on a digital storage medium or can be transmitted on a transmission medium such as a wireless transmission medium or a wired transmission medium such as the Internet.

In a different embodiment, the switch 200 of FIG. 1*a* or 2*a* switches between the two coding branches 400, 500. In a further embodiment, there can be additional encoding branches such as a third encoding branch or even a fourth encoding branch or even more encoding branches. On the decoder side, the switch 600 of FIG. 1*b* or 2*b* switches between the two decoding branches 431, 440 and 531, 532, 533, 534, 540. In a further embodiment, there can be additional decoding branches such as a third decoding branch or even a fourth decoding branch or even more decoding branches. Similarly, the other switches 521 or 532 may switch between more than two different coding algorithms, when such additional coding/decoding branches are provided.

The above-described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

Depending on certain implementation requirements of the inventive methods, the inventive methods can be implemented in hardware or in software. The implementation can be performed using a digital storage medium, in particular, a disc, a DVD or a CD having electronically-readable control signals stored thereon, which co-operate with programmable computer systems such that the inventive methods are performed. Generally, the present invention is therefore a computer program product with a program code stored on a machine-readable carrier, the program code being operated for performing the inventive methods when the computer program product runs on a computer. In other words, the inventive methods are, therefore, a computer program having a program code for performing at least one of the inventive methods when the computer program runs on a computer.

Some example solutions are listed below.

1. Audio encoder for encoding an audio input signal (195), the audio input signal being in a first domain, comprising:

a first coding branch (400) for encoding an audio signal using a first coding algorithm to obtain a first encoded signal;

a second coding branch (500) for encoding an audio signal using a second coding algorithm to obtain a second encoded signal, wherein the first coding algorithm is different from the second coding algorithm; and a first switch (200) for switching between the first coding branch and the second coding branch so that, for a portion of the audio input signal, either the first encoded signal or the second encoded signal is in an encoder output signal, wherein the second coding branch comprises:

a converter (510) for converting the audio signal into a second domain different from the first domain, a first processing branch (522) for processing an audio signal in the second domain to obtain a first processed signal;

a second processing branch (523, 524) for converting a signal into a third domain different from the first domain and the second domain and for processing the signal in the third domain to obtain a second processed signal; and a second switch (521) for switching between the first processing branch (522) and the second processing branch (523, 524) so that, for a portion of the audio signal input into the second coding branch, either the first processed signal or the second processed signal is in the second encoded signal.

2. Audio encoder in accordance with solution 1, in which the first coding algorithm in the first coding branch (400) is based on an information sink model, or in which the second coding algorithm in the second coding branch (500) is based on an information source or a signal to noise ratio (SNR) model.

3. Audio encoder in accordance with solution 1 or 2, in which the first coding branch comprises a converter (410) for converting the audio input signal into a fourth domain different from the first domain, the second domain, and the third domain.

4. Audio encoder in accordance with one of the preceding solutions, in which the first domain is the time domain, the second domain is an LPC domain obtained by an LPC filtering the first domain signal, the third domain is an LPC spectral domain obtained by converting an LPC filtered signal into a spectral domain, and the fourth domain is a spectral domain obtained by frequency domain converting the first domain signal.

5. Audio encoder in accordance with one of the preceding solutions, further comprising a controller (300, 525) for controlling the first switch (200) or the second switch (521) in a signal adaptive way, wherein the controller is operative to analyze a signal input into the first switch (200) or output by the first coding branch or the second coding branch or a signal obtained by decoding an output signal of the first coding branch or the second coding branch with respect to a target function, or wherein the controller (300, 525) is operative to analyze a signal input into the second switch (521) or output by the first processing branch or the second processing branch or signals obtained by inverse processing output signals from the first processing branch (522) and the second processing branch (523, 524) with respect to a target function.

6. Audio encoder in accordance with one of the preceding solutions, in which the first coding branch (400) or the second processing branch (523, 524) of the second coding branch (500) comprises an aliasing introducing time/frequency converter and a quantizer/entropy coder stage (421) and wherein the first processing branch of the second coding branch comprises a quantizer or entropy coder stage (522) without an aliasing introducing conversion.

7. Audio encoder in accordance with solution 6, in which the aliasing introducing time/frequency converter comprises a windower for applying an analysis window and a modified discrete cosine transform (MDCT) algorithm, the windower being operative to apply the window function to subsequent frames in an overlapping manner so that a sample of an input signal into the windower occurs in at least two subsequent frames.

8. Audio encoder in accordance with one of the preceding solutions, in which the first processing branch (522) comprises the LPC excitation coding of an algebraic code excited linear prediction (ACELP) coder and the second processing branch comprises an MDCT spectral converter and a quantizer for quantizing spectral components to obtain quantized spectral components, wherein each quantized spectral component is zero or is defined by one quantization index of a plurality of quantization indices.

9. Audio encoder in accordance with solution 5, in which the controller is operative to control the first switch (200) in an open loop manner and to control the second switch (521) in a closed loop manner.

10. Audio encoder in accordance with one of the preceding solutions, in which the first coding branch and the second coding branch are operative to encode the audio signal in a block wise manner, wherein the first switch or the second switch are switching in a block-wise manner so that a switching action takes place, at the minimum, after a block of a predefined number of samples of a signal, the predefined number of samples forming a frame length for the corresponding switch (521, 200).

11. Audio encoder in accordance with solution 10, in which the frame length for the first switch is at least double the size of the frame length of the second switch.

12. Audio encoder in accordance with solution 5, in which the controller is operative to perform a speech/music discrimination in such a way that a decision to speech is favored with respect to a decision to music so that a decision to speech is taken even when a portion less than 50% of a frame for the first switch is speech and a portion more than 50% of the frame for the first switch is music.

13. Audio encoder in accordance with solution 5 or 12, in which a frame for the second switch is smaller than a frame for the first switch, and in which the controller (525, 300) is operative to take a decision to speech when only a portion of the first frame which has a length which is more than 50% of the length of the second frame is found out to include music.

14. Audio encoder in accordance with one of the preceding solutions, in which the first encoding branch (400) or the second processing branch of the second coding branch includes a variable time warping functionality.

15. Method of encoding an audio input signal (195), the audio input signal being in a first domain, comprising:

encoding (400) an audio signal using a first coding algorithm to obtain a first encoded signal;

encoding (500) an audio signal using a second coding algorithm to obtain a second encoded signal, wherein the first coding algorithm is different from the second coding algorithm; and switching (200) between encoding using the first coding algorithm and encoding using the second coding algorithm so that, for a portion of the audio input signal, either the first encoded signal or the second encoded signal is in an encoded output signal, wherein encoding (500) using the second coding algorithm comprises:

converting (510) the audio signal into a second domain different from the first domain, processing (522) an audio signal in the second domain to obtain a first processed signal;

converting (523) a signal into a third domain different from the first domain and the second domain and processing (524) the signal in the third domain to obtain a second processed signal; and switching (521) between processing (522) the audio signal and converting (523) and processing (524) so that, for a portion of the audio signal encoded using the second coding algorithm, either the first processed signal or the second processed signal is in the second encoded signal.

16. Decoder for decoding an encoded audio signal, the encoded audio signal comprising a first coded signal, a first processed signal in a second domain, and a second processed signal in a third domain, wherein the first coded signal, the first processed signal, and the second processed signal are related to different time portions of a decoded audio signal, and wherein a first domain, the second domain and the third domain are different from each other, comprising:

a first decoding branch (431, 440) for decoding the first encoded signal based on the first coding algorithm;

a second decoding branch for decoding the first processed signal or the second processed signal, wherein the second decoding branch comprises a first inverse processing branch (531) for inverse processing the first processed signal to obtain a first inverse processed signal in the second domain;

a second inverse processing branch (533, 534) for inverse processing the second processed signal to obtain a second inverse processed signal in the second domain;

a first combiner (532) for combining the first inverse processed signal and the second inverse processed signal to obtain a combined signal in the second domain; and a converter (540) for converting the combined signal to the first domain; and a second combiner (600) for combining the converted signal in the first domain and the first decoded signal output by the first decoding branch to obtain a decoded output signal in the first domain.

17. Decoder of the solution 16, in which the first combiner (532) or the second combiner (600) comprises a switch having a cross fading functionality.

18. Decoder of solution 16 or 17, in which the first domain is a time domain, the second domain is an LPC domain, the third domain is an LPC spectral domain, or the first encoded signal is encoded in a fourth domain, which is a time-spectral domain obtained by time/frequency converting a signal in the first domain.

19. Decoder in accordance with any of the solutions 16 to 18, in which the first decoding branch (431, 440) comprises an inverse coder and a de-quantizer and a frequency domain time domain converter (440), or the second decoding branch comprises an inverse coder and a de-quantizer in the first inverse processing branch or an inverse coder and a de-quantizer and an LPC spectral domain to LPC domain converter (534) in the second inverse processing branch.

20. Decoder of solution 19, in which the first decoding branch or the second inverse processing branch comprises an overlap-adder for performing a time domain aliasing cancellation functionality.

21. Decoder in accordance with one of solution 16 to 20, in which the first decoding branch or the second inverse processing branch comprises a de-warper controlled by a warping characteristic included in the encoded audio signal.

22. Decoder in accordance with one of solutions 16 to 21, in which the encoded signal comprises, as side information (4_a_), an indication whether a coded signal is to be coded by a first encoding branch or a second encoding branch or a first processing branch of the second encoding branch or a second processing branch of the second encoding branch, and which further comprises a parser for parsing the encoded signal to determine, based on the side information (4_a_), whether a coded signal is to be processed by the first decoding branch, or the second decoding branch, or the first inverse processing branch of the second decoding branch or the second inverse processing branch of the second decoding branch.

23. Method of decoding an encoded audio signal, the encoded audio signal comprising a first coded signal, a first processed signal in a second domain, and a second processed signal in a third domain, wherein the first coded signal, the first processed signal, and the second processed signal are related to different time portions of a decoded audio signal, and wherein a first domain, the second domain and the third domain are different from each other, comprising: decoding (431, 440) the first encoded signal based on a first coding algorithm;

decoding the first processed signal or the second processed signal, wherein the decoding the first processed signal or the second processed signal comprises:

inverse processing (531) the first processed signal to obtain a first inverse processed signal in the second domain;

inverse processing (533, 534) the second processed signal to obtain a second inverse processed signal in the second domain;

combining (532) the first inverse processed signal and the second inverse processed signal to obtain a combined signal in the second domain; and converting (540) the combined signal to the first domain; and combining (600) the converted signal in the first domain and the decoded first signal to obtain a decoded output signal in the first domain.

24. Encoded audio signal comprising:

a first coded signal encoded or to be decoded using a first coding algorithm, a first processed signal in a second domain, and a second processed signal in a third domain, wherein the first processed signal and the second processed signal are encoded using a second coding algorithm, wherein the first coded signal, the first processed signal, and the second processed signal are related to different time portions of a decoded audio signal, wherein a first domain, the second domain and the third domain are different from each other, and side information (4*a*) indicating whether a portion of the encoded signal is the first coded signal, the first processed signal or the second processed signal.

25. Computer program for performing, when running on the computer, the method of encoding an audio signal in accordance with solution 15 or the method of decoding an encoded audio signal in accordance with solution 23.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

What is claimed is:

1. Method of decoding an encoded audio signal, the encoded audio signal comprising a first encoded signal, a first processed signal in a second domain, and a second processed signal in a third domain, comprising:

decoding the first encoded signal to obtain a decoded first signal;

decoding the first processed signal or the second processed signal, wherein the decoding the first processed signal or the second processed signal comprises:

inverse processing the first processed signal to acquire a first inverse processed signal in the second domain;

inverse processing the second processed signal to acquire a second inverse processed signal in the second domain;

combining the first inverse processed signal and the second inverse processed signal to acquire a combined signal in the second domain; and converting the combined signal in the second domain to a first domain to obtain a converted signal; and combining the converted signal and the decoded first signal to acquire a combined signal in the first domain;

wherein the method comprises post-processing the combined signal in the first domain, wherein an output signal of the post-processing is an expanded version of the combined signal in the first domain.

2. Method of the claim 1, in which the combining the first inverse processed signal and the second inverse processed signal or the combining the converted signal and the decoded first signal comprises switching, the switching comprising a cross fading functionality.

3. Method of claim 1, in which the first domain is a time domain, the second domain is an LPC domain, and the third domain is an LPC spectral domain.

4. Method of claim 1, wherein the first encoded signal is encoded in a fourth domain, which is a time-spectral domain acquired by time/frequency converting a signal in the first domain.

5. Method of claim 1, in which the decoding the first encoded signal comprises inverse coding and de-quantizing and frequency domain time domain converting.

6. Method of claim 1, wherein the decoding the first processed signal or the second processed signal comprises inverse coding and de-quantizing in the inverse processing the first processed signal.

7. Method of claim 1, wherein the decoding the first processed signal or the second processed signal comprises inverse coding and de-quantizing and LPC spectral domain to LPC domain converting in the inverse processing the second processed signal.

8. Method of claim 1, in which the decoding the first encoded signal or the inverse processing the second processed signal comprises overlap-adding for performing a time domain aliasing cancellation functionality.

9. Method of claim 1, in which the decoding the first encoded signal or the inverse processing the second processed signal comprises de-warping controlled by a warping characteristic comprised in the encoded audio signal.

10. Method of claim 1, in which the encoded signal comprises, as side information, an indication whether the encoded signal is to be decoded by the decoding the first encoded signal or the decoding the first processed signal or the second processed signal or the inverse processing the first processed signal or the inverse processing the second processed signal-, and which further comprises parsing the encoded signal to determine, based on the side information, whether the encoded signal is to be processed by the decoding the first encoded signal, or the decoding the first processed signal or the second processed signal, or the inverse processing the first processed signal or the inverse processing the second processed signal-.

11. Method of claim 1, in which the post-processing comprises at least one of a joint multichannel decoding method or a bandwidth extension processing.

12. Method of claim 11, in which the joint multichannel decoding method comprises a parameter decoding method and an upmixing controlled by a parameter decoding method output.

13. Method of claim 11, in which the bandwidth extension processing comprises patching for creating a high band signal, adjusting the high band signal to obtain an adjusted high band signal, and combining the adjusted high band signal and a low band signal to acquire a bandwidth extended signal.

14. Method of claim 1, wherein the converting comprises an LPC synthesis controlled by LPC information.

15. A non-transitory storage medium having stored thereon a computer program for performing, when running on a computer, a method of decoding an encoded audio signal, the encoded audio signal comprising a first encoded signal, a first processed signal in a second domain, and a second processed signal in a third domain, the method of decoding comprising:

decoding the first encoded signal to obtain a decoded first signal;

decoding the first processed signal or the second processed signal, wherein the decoding the first processed signal or the second processed signal comprises:

inverse processing the first processed signal to acquire a first inverse processed signal in the second domain;

inverse processing the second processed signal to acquire a second inverse processed signal in the second domain;

combining the first inverse processed signal and the second inverse processed signal to acquire a combined signal in the second domain; and converting the combined signal in the second domain to a first domain to obtain a converted signal; and combining the converted signal and the decoded first signal to acquire a combined signal in the first domain;

wherein the method comprises post-processing the combined signal in the first domain, wherein an output signal of the post-processing is an expanded version of the combined signal in the first domain.

* * * * *